(12) United States Patent
Grayson et al.

(10) Patent No.: US 12,302,236 B2
(45) Date of Patent: May 13, 2025

(54) PROVIDING AN ALTERNATIVE ACCESS NETWORK INDICATION TO A CLIENT DEVICE IN A WIRELESS LOCAL AREA NETWORK ROAMING FEDERATION

(71) Applicant: Cisco Technology, Inc., San Jose, CA (US)

(72) Inventors: Mark Grayson, Berkshire (GB); Jerome Henry, Pittsboro, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 437 days.

(21) Appl. No.: 17/903,326

(22) Filed: Sep. 6, 2022

(65) Prior Publication Data
US 2024/0080757 A1    Mar. 7, 2024

(51) Int. Cl.
| | |
|---|---|
| *H04W 48/18* | (2009.01) |
| *H04W 8/02* | (2009.01) |
| *H04W 12/06* | (2021.01) |
| *H04W 48/08* | (2009.01) |
| *H04W 84/12* | (2009.01) |

(52) U.S. Cl.
CPC .............. *H04W 48/18* (2013.01); *H04W 8/02* (2013.01); *H04W 12/06* (2013.01); *H04W 48/08* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 10,813,042 B1 | 10/2020 | Gundavelli et al. | |
| 11,166,217 B2 | 11/2021 | Smith et al. | |
| 11,337,147 B2 | 5/2022 | Gundavelli et al. | |
| 2014/0227996 A1 | 8/2014 | Tuilier et al. | |
| 2016/0044592 A1* | 2/2016 | Guilford | H04W 48/18 455/432.1 |
| 2020/0163013 A1* | 5/2020 | Grayson | H04W 8/26 |
| 2021/0281994 A1* | 9/2021 | Stammers | H04W 8/12 |

(Continued)

OTHER PUBLICATIONS

"Passpoint Specification," Wi-Fi Alliance, Specification, Version 3.2.7, 2022, 223 pages.

(Continued)

*Primary Examiner* — Atta Khan
(74) *Attorney, Agent, or Firm* — Edell, Shapiro & Finnan, LLC

(57) ABSTRACT

Presented herein are techniques associated with providing an alternative network indication to a client device in a wireless local area network (WLAN) roaming federation. In one example a method is provided that may include obtaining access network information for each of a plurality of access networks that neighbor a first access network through connection of a client device with the first access network involving a first identity provider profile; determining an alternative access network with which the client device is recommended to seek connection or an alternative identity provider profiles with which the client device is recommended to connect to the first access network; and enabling the client device to initiate a connection with the alternative access network or to re-initiate a connection with the first access network utilizing the alternative identity provider profile.

20 Claims, 5 Drawing Sheets

(56) References Cited

U.S. PATENT DOCUMENTS

| | | | |
|---|---|---|---|
| 2021/0288936 A1* | 9/2021 | Grayson | H04L 61/4552 |
| 2022/0007438 A1 | 1/2022 | Agrawal et al. | |
| 2022/0070652 A1* | 3/2022 | Grayson | H04W 12/06 |
| 2022/0141714 A1 | 5/2022 | Smith et al. | |
| 2023/0036506 A1* | 2/2023 | Ficara | H04L 63/104 |
| 2023/0143696 A1* | 5/2023 | Canpolat | H04W 48/02 |
| | | | 370/338 |
| 2023/0164554 A1* | 5/2023 | Canpolat | H04W 12/30 |
| | | | 726/7 |
| 2024/0080757 A1* | 3/2024 | Grayson | H04W 12/06 |
| 2024/0305985 A1* | 9/2024 | Brinckman | H04W 12/084 |

OTHER PUBLICATIONS

"Hotspot 2.0 Specification," Wi-Fi Alliance, Specification, Version 3.1, Apr. 24, 2019, 203 pages.

"Part 11: Wireless LAN Medium Access Control (MAC) and Physical Layer (PHY) specifications—Amendment 8: IEEE 802.11 Wireless Network Management," IEEE Standard for Information Technology—Telecommunications and information exchange between systems Local and metropolitan area networks—Specific requirements, IEEE Std 802.11v, Feb. 2, 2011, 433 pages.

"Part 11: Wireless LAN Medium Access Control (MAC) and Physical Layer (PHY) Specifications—Amendment 1: Radio Resource Measurement of Wireless LANs," IEEE Standard for Information technology—Telecommunications and information exchange between systems—Local and metropolitan area networks—Specific requirements, IEEE Std 802.11k, Jun. 12, 2008, 244 pages.

Jerome Henry, "ANQP Elements Guidelines," Wireless Broadband Alliance, Cisco Systems, Version V1.0, Jun. 6, 2022, 12 pages.

Jerome Henry, et al., "ANQP elements Augmentation Proposal," IEEE P802.11, Wireless LANs, IEEE 802.11-21/1012r010, Oct. 31, 2021, 13 p.

Dr. Necati Canpolat, "OpenRoaming: One Global Network of Wi-Fi Networks," Intel, White Paper, Wireless Systems Global Connectivity, May 24, 2021, 6 pages.

* cited by examiner

PROVIDING AN ALTERNATIVE ACCESS NETWORK INDICATION TO A CLIENT DEVICE IN A WIRELESS LOCAL AREA NETWORK ROAMING FEDERATION

TECHNICAL FIELD

The present disclosure relates to network equipment and services.

BACKGROUND

Networking architectures have grown increasingly complex in communications environments, particularly mobile networking environments. OpenRoaming™ has revolutionized Institute of Electrical and Electronics Engineers (IEEE) 802.11 (e.g., Wi-Fi®) roaming. However, even with the introduction of OpenRoaming, significant challenges remain regarding the management of client devices connecting to wireless local area networks.

DETAILED DESCRIPTION

Overview

Figure 1:
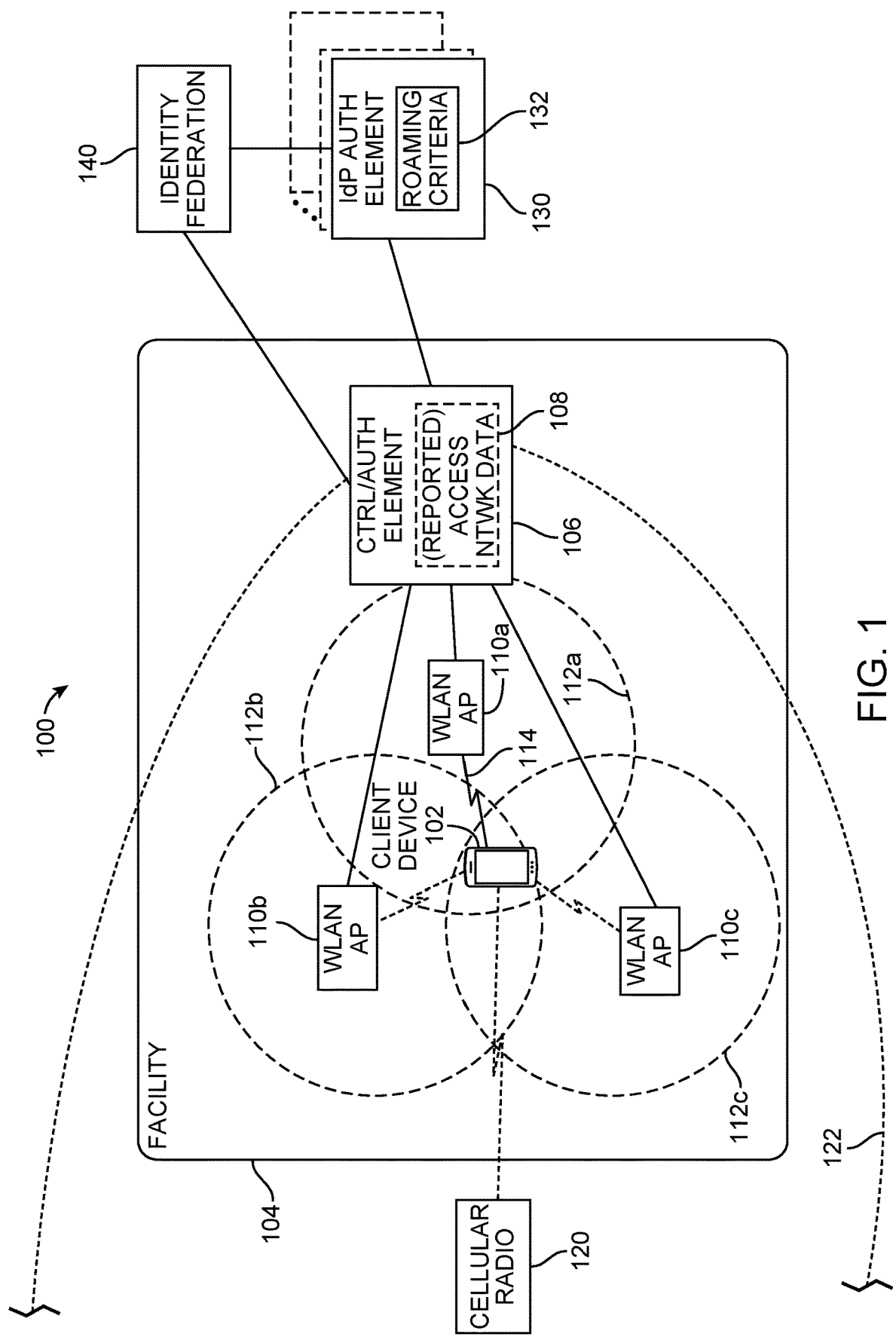
FIG. 1 is a diagram of a system in which techniques that facilitate providing an alternative access network indication or an alternative identity provider profile indication to a client device in a wireless local area network (WLAN) roaming federation may be implemented, according to an example embodiment.

Techniques presented herein may be associated with providing one or more alternative access network indications to a client device in a wireless local area network (e.g., Wi-Fi®) roaming federation in order to enable the client device to initiate a connection with one or more alternative access networks. In at least one embodiment, a computer-implemented method is provided that may include obtaining, by an authentication element for an identity provider in a wireless local area network roaming federation, access network information for each of a plurality of access networks that neighbor a first access network, wherein the access network information is obtained through connection of a client device with the first access network involving a first identity provider profile for the client device; determining, by the authentication element, one or more alternative access networks with which the client device is recommended to seek connection instead of the first access network or one or more alternative identity provider profiles with which the client device is recommended to connect to the first access network based, at least in part, on the access network information and roaming criteria of the identity provider; and enabling, based on the determining, the client device to initiate a connection with at least one alternative access network of the one or more alternative access networks or to re-initiate a connection with the first access network utilizing one or more alternative identity provider profiles.

Example Embodiments

In a wireless local area network (WLAN) roaming (e.g., Wi-Fi®️ roaming) architecture bilateral roaming agreements between identity providers (IdPs or IDPs) and access network providers (ANPs) providing radio access network (RAN) connectivity via a 'visited' or 'guest' access network (also broadly referred to as a visited or guest network) can enable IdPs to know a priori information pertaining to certain aspects of a roamed-to or guest access network. This a priori information may include the geolocation of an access network to which to possibly offload a client device, which could then enable a given IdP to determine possible alternative options (e.g., other, potentially better offload guest networks) for serving customers when a client device was in range of a particular (guest) access network.

Such capabilities can be used to rank the effectiveness of offload. For example, if a wireless access network exists in isolation, with no alternative networks nearby, then the IdP may preferably authorize access. However, if alternative access networks are available, the IdP may decline access to one network and authorize access to one of the alternative options. In some embodiments, the authorization decision may further depend on rating information, whereby one out of a plurality of access networks is preferred because of one or more financial aspects (which may only relate to cost or may integrate cost to performance ratios) of serving an outbound roamer on a specific access network, compared to other alternative overlapping access networks.

However, in a roaming federation like OpenRoaming™ (OR), there is no bilaterally exchanged information between an IdP and an ANP (beyond identity validation) and the IdP may not know a priori information concerning the local access network, and possibly the overlapping alternative networks.

As a background to WLAN roaming architectures, consider a standard Passpoint network, as an example, in which a venue providing a guest access network could establish an agreement with an IdP, then announce the IdP's name into its access points' messages (e.g., using beacons etc., broadcast from WLAN access points (APs) for the guest access network indicating, for example, 'this network supports the IdPs credentials'). A client device (e.g., mobile device, station, or 'STA') configured with a Passpoint profile (sometimes referred to as a 'subscription') that included the IdP's credentials could detects these AP messages and ask the AP to relay the client device's authentication to the matching domain (e.g., an Extensible Authentication Protocol (EAP)/802.1X query to the venue AP is made to 'idp.com'). The AP could then relay the query to the matching IdP, and the IdP could authenticates the user/client device and return an Access-Accept Remote Authentication Dial-in User Service (RADIUS) message to the venue AP/client device such that the client device could then be connected, automatically and securely, to the venue's (guest) access network.

However, the Passpoint system did not scale since one IdP needs to negotiate a bi-lateral agreement with potentially hundreds of millions of hotspots (venues/guest access networks) on the planet, and each venue would have to negotiate with every possible IdP on the planet. Thus, the adoption of Passpoint was limited.

In contrast, OpenRoaming breaks these limitations by introducing an entity, referred to as an OpenRoaming federation or, more generally, an identity federation, that interfaces between venues and IdPs such that venues and IdPs can signs up to be members of the OpenRoaming federation. Thus, through OpenRoaming, individual negotiations between each of a given venue and each of a given IdP is no longer necessary. Rather, a venue/guest access network (AP for the venue/guest access network) can announce the federation (e.g., 'this network supports OpenRoaming IdPs'), and a user/client device with a Passpoint profile from any IdP member of the federation can attempt to join the network securely with a chosen IdP profile. OpenRoaming defines additional options for a Passpoint profile, however, other profile options (e.g., defined by third-parties) may be utilized in OpenRoaming or other federated roaming environments that may or may not be characterized as Passpoint profiles.

Because a given venue announces the federation and because joining the federation is simple, many venues in public places (e.g., shopping malls, arenas, airports, etc., any of which can be broadly referred to herein as a 'facility') have started joining the federation and announcing it. However, the conditions that each venue offers to a client device may differ (e.g., superstore A may provide X megabits per second (Mbps) bandwidth (BW) to each user, while small store B may only offer Y kilobits per second (Kbps), or jitter, delay, etc. may differ, or the like). Thus, it becomes common for a client device to detect, for a particular location multiple, different venues/guest access networks announcing the OpenRoaming federation but the client device does not know which one to join for a given IdP profile.

For example, when the client device attempts to join one guest access network with a given IdP profile, the IdP associated with the IdP profile sees a request coming from an access network but does not know if that access network was the only choice of networks for the client device, or if there were other options (e.g., overlapping access networks) available to the client device. If there were other options, the IdP may have recommended another access network instead of the access network from which the request was received.

However, as noted above, in a roaming federation such OpenRoaming, there is no bilaterally exchanged information between an IdP and an ANP (beyond identity validation) and the IdP may not know a priori information concerning the local access network, and possibly the overlapping alternative networks.

In the early days of Passpoint (Release 1), the efforts of the industry were focused on providing automated connectivity (e.g., connecting client to any network that supports Passpoint and the client IDP). The industry (and the Wi-Fi Alliance (WFA)) soon realized that this idealized method did not work well, essentially because the world is a big place, and not all guest networks are the same from the user standpoint and not all guest networks are the same from the IDP standpoint. Therefore, Passpoint Release 2 introduced policy enhancements to Release 1, many of which were inscribed in a profile (using a Per Provider Subscription (PPS) Management Object (MO) (PPS-MO)) that could be installed on a client device along with an IdP subscription. This was sufficient to provide conditions (driven by the IdP but installed statically with the subscription) that could complement the device's decision. Thus, the device could run through internal algorithms first (based on Service Set Identifier (SSID) value, Received Signal Strength Indicator (RSSI)/Signal-to-Noise Ratio (SNR), user preferences, etc.), through which the client device could establish a short list of SSIDs that were possible candidates for selection. The client device could then parse the PPS-MOs matching the advertised IdPs and make a second short list of the one or more possible profiles. Next, the client device could simply pick the first matching entry in the (second) list. It is to be understood that other clients implementing Passpoint technologies that may not implement PPS-MO standards (e.g., implementing extensible markup language (XML)-based operations, etc.) can include similar logic/algorithms that facilitate network selection for such clients.

This modus operandi does not scale well in a federation, where there may be many venues/guest access networks/ SSIDs at close range, thus many candidate guest networks that could pass the initial internal algorithm selection criteria, and many possible IdPs for each of access network. In a federation-based scenario, the client no longer has a preference (several SSIDs and IDPs may equally match). However, a given venue and a given IDP may have a preference, for example, because of some form of relationship between the IdP and one venue versus another, whereby the client is either likely to obtain better access conditions in one network versus another (e.g., better bandwidth) or, in another example, the client may receive the same conditions, but the IdP may receive a preferential roaming cost for the client.

Accordingly, techniques herein provide an IdP with the ability IdP to determine authorization of one out of a plurality of roamed-to network authorizations within a federation based on guest access network information obtained by the IdP during authorization of a client device that connected with/seeking connection with a given guest access network.

Referring first to FIG. 1, a block diagram is shown of a system 100 in which techniques that facilitate providing an alternative access network indication to a client device in a WLAN roaming federation may be implemented, according to an example embodiment. The system 100 may include a facility 104 (e.g., shopping mall, arena, airport, etc.) providing a number of guest radio access networks provided by corresponding WLAN access points (APs) or cellular radio devices, in some instances.

As illustrated in FIG. 1, consider that facility 104 includes a WLAN AP 110a provides a (guest) WLAN (e.g., Wi-Fi) access network 112a, a WLAN AP 110b provides a (guest) WLAN access network 112b, and a WLAN AP 110c provides a (guest) WLAN access network 112c. The facility 104 may also include any combination of a WLAN controller or management system (CTRL) and/or an authentication/authorization (AUTH) element, shown in FIG. 1 as a CTRL/AUTH element 106. CTRL/AUTH element 106 for facility 104 may be implemented as any combination of RADIUS Security (RadSec) proxy server, an Authentication, Authorization and Accounting proxy server, or the like. Although only one CTRL/AUTH element 106 is illustrated for facility 104, it is to be understood that in some instances a CTRL/ AUTH element could be provided for each WLAN AP 110a-110c of system 100. For various examples/embodiments discussed herein, the terms 'WLAN access network', 'WLAN', and 'wireless local area (WLA) access network' and any variations thereof can be used interchangeably to refer to any form/implementation/deployment of a Wi-Fi/ IEEE 802.11 (any applicable variant thereof) wireless access network.

Also shown in FIG. 1 is a cellular radio 120, which can be deployed internal or external to the facility 104, such that cellular radio 120 can provide a cellular (e.g., Third Generation Partnership Project (3GPP) and/or Citizens Broadband Radio Service (CBRS)) access network 122 that can overlap, in whole and/or in part, the geographical area/ access networks 112a-112 of facility 104. Only a portion of cellular access network 122 is illustrated in FIG. 1.

Also shown in FIG. 1 are a client device 102, an identity provider (IdP) authentication/authorization (AUTH) element 130, and an identity federation entity 140. In various embodiments, the IdP AUTH element 130 may be implemented as any combination of an AAA server, a RadSec server, and/or the like. In some examples discussed herein, CTRL/AUTH element 106 of facility 104 may be referred to as an 'authenticator' and IdP AUTH element 130 may be referred to as an 'authentication source' with regard to various authentication exchanges involving client device 102.

Each WLAN access network 112-112c and cellular access network 122 may provide a corresponding coverage area, as generally illustrated by the dashed-line circles for each access network, represents an area within which one more client devices, such as client device 102 can attach/connect to a given AP/radio for voice/data connectivity with one or more data networks (not shown), such as the Internet, an Internet Protocol (IP) multimedia subsystem (IMS), an Ethernet network, an Ethernet switching system(s), and/or the like. It is to be understood that the size/shape of the coverage area of each WLAN access network 112-112c and cellular access network 122 is provided for illustrative purposes only and is not meant to limit the broad scope of embodiments herein. In some instances, the coverage area of cellular access network 122 can be referred to as a 'cell'.

Identity federation entity 140 can interface with IdP AUTH element 130 and CTRL/AUTH element 106 of facility 104 (or multiple CTRL/AUTH elements for facility 104, if implemented in such a manner). IdP AUTH element 130 can also interface with CTRL/AUTH element 106 (or multiple CTRL/AUTH elements for facility 104, if implemented in such a manner). Each WLAN AP 110a-110c can also interface with CTRL/AUTH element 106 (or each WLAN AP 110a-110c could interface with their own CTRL/ AUTH element, if implemented in such a manner). In some instances, IdP AUTH element 130 and/or CTRL/AUTH element 106 may also interface with one or more cellular radios, such as cellular radio 120.

Generally, the identity federation entity 140 may be associated with an identity federation network, service, and/or servers. In one embodiment, the identity federation entity 140 may be implemented as an OpenRoaming federation entity. In a typical OpenRoaming architecture, an identity federation may be considered an intermediary service that facilitates interaction with trusted identity providers to allow users/client devices to join any guest access network managed by a federation member. Although various example details discussed herein may be discussed with reference to an OpenRoaming federation or OpenRoaming environment, it is to be understood that any embodiments discussed and/or envisioned herein may be applicable to any federation-based roaming environments in addition to and/ or in-lieu of an OpenRoaming environment.

Accordingly, the system 100 of FIG. 1 may represent a roaming federation architecture in which IdP AUTH element 130 is associated with a given IdP that is a federation member of a roaming federation facilitated by identity federation entity 140 such that IdP AUTH element 130 provided identity authentication/verification services for one or more users/client devices, such as client device 10. Further, each WLAN AP 110a-110c and each corresponding WLAN access network 112a-112c can each be associated with a different corresponding access network service provider (SP), ANP, or venue that are each a federation member of the roaming federation facilitated by identity federation entity 140 that offers (guest) access network services to one or more IdPs, such as the IdP for IdP AUTH element 130 in order to facilitate connectivity for roaming users having roaming profiles configured for the IdP. For example, WLAN AP/WLAN access network 110a/112a may be associated with a particular venue 'VENUE A', WLAN AP/WLAN access network 110b/112b may be associated with another venue 'VENUE B', and WLAN AP/WLAN access network 110c/112c may be associated with another venue 'VENUE C' in which each venue may be a member of the roaming federations provided by identity federation entity 140.

In some instances, cellular radio 120/cellular access network 122 can be associated with an SP/ANP/venue that is a federation member of the roaming federation facilitated by identity federation entity 140 that offers (guest) access network services to one or more IdPs.

Generally, an IdP, such as the IdP operating/managing IdP AUTH element 130 can be a service provider (SP), an employer or business, and/or a third-party identity provider with which a user associated with the client device 102 may have a subscription, may be an employee of, may be associated with (e.g., via a loyalty program or the like), etc. for services, including roaming services, etc.

Although only a single IdP and three venues (WLAN APs/WLAN access networks 110a-110c/112a-112c) are shown in FIG. 1, it is to be understood that any number of guest access networks and/or multiple IdPs/IdP AUTH elements 130 can be implemented in system 100 in which each IdP/IdP AUTH element 130 can be associated with a different IdP profile configured/provisioned for client device 102. For Example, a first IdP profile provisioned for client device 102 for the IdP operating/managing IdP AUTH element 130 may be identified/configured as 'user102@idp130.com'. Another IdP profile provisioned for client device 102 for another IdP operating another IdP AUTH element XXX (not shown) in system 100 may be identified as 'user102@idpXXX.com', and so forth for any number of IdP profiles that may be provisioned for client device 102. Accordingly, any number of facilities, venues, and IdPs can be present within system 100 in accordance with embodiments herein.

An IdP profile, also sometimes referred to as a PPS MO profile can include any combination of Subscriber Identification Module (SIM)-based credentials/characteristics and/ or International Mobile Subscriber Identity (IMSI)-based credentials/characteristics that can be used for authentication by a client device, such as any combination of a username, password, certificate, whether credentials apply to a client or a user of the client, the realm (e.g., @idp130.com) that credentials authenticate against, an EAP type, etc. Some credentials may be passed to an IdP during authentication, such as username/password, may not be passed from an IdP/IdP AUTH element to a client (e.g., due to privacy concerns) but may instead be used by a client in order to choose an IdP/IdP AUTH element and authentication method for authentication via a given (guest) WLAN access network.

An IdP/PPS MO profile may contain any other policy information/characteristics that may be used to influence/facilitate profile/network selection by a client for authenticating onto a given WLAN access network, such as any combination of preferred roaming partner information (e.g., Fully Qualified Domain Name (FQDN) of an authentication provider/IdP, priority information, and country information), backhaul/Wide Area Network (WAN) parameters (e.g., minimum uplink bandwidth (potentially per network type, such as home or roaming), minimum downlink bandwidth (potentially per network type, such as home or roaming), policy update information, roaming network type (e.g., 'free' or 'chargeable'), home network information (e.g., SSID), profile name, and/or any other information that may be used to influence/facilitate client profile/network selection.

In some embodiments, multiple profiles for a same IdP can be configured for a client device. For example, a first profile for an IdP may be associated with a pay-as-you-go service in which a user for the client device has contracted certain quality, etc. criteria for a certain service level (e.g., a profile named 'TopTierIdP130' associated with a realm '@payasyougo.idp130.com') and a second profile for the same IdP may be associated with a free service in which the client may receive service not charged to the user but meeting other criteria of the IdP (e.g., a profile named 'FirstTierIdP130' associated with a realm '@free.idp130.com'). Other variations of multiple IdP profiles for a same IdP can be envisioned.

A WLAN AP or cellular radio as discussed for embodiments herein may include any combination of hardware (e.g., communications units, receiver(s), transmitter(s), antenna(s) and/or antenna array(s), processor(s), memory element(s), baseband processor(s) (modems), etc.), controllers (e.g., wireless local area network controllers, etc.), software, logic, and/or any other elements/entities that may facilitate access network connections for one or more client devices for system 100.

For example, in various embodiments, cellular access network 122 provided by cellular radio 120 may provide any 3GPP/CBRS radio access network (RAN) coverage for Radio Access Technology (RAT) type, such as any combination of licensed spectrum wireless wide area (WWA) access networks, such as 3GPP access networks (e.g., 4G/Long Term Evolution (LTE), Fifth Generation (5G), next Generation (nG), etc. access networks), unlicensed spectrum 3GPP access networks (e.g., License Assisted Access (LAA), enhanced LAA (eLAA), 5G New Radio (NR) in Unlicensed (5G NR-U), etc. access networks), CBRS access networks, and/or the like. Thus, cellular radio 120 may be implemented as any combination of 4G/LTE evolved Node Bs (eNBs or eNodeBs), 5G/next generation NodeBs (gNBs), and/or any other radio devices now known here or hereafter developed that may facilitate over-the-air Radio Frequency (RF) connections with one or more devices, such as the client device 102. In various embodiments, WLAN access networks 110a-110c provided by corresponding WLAN APs, such as any of WLAN AP 110a-110c may provide RAN coverage for any unlicensed spectrum wireless local area (WLA) access networks, such as Institute of Electrical and Electronics Engineers (IEEE) 802.11 networks for any variation/combination of 802.11 variants (e.g., Wi-Fi 5/6/6E/7/etc.).

Cellular access network 122 provided by cellular radio 120 can be configured with network identity, such as a Public Land Mobile Network (PLMN) identity (PLMN-ID) that consists of a 3-digit Mobile Country Code (MCC) and a 2- or 3-digit Mobile Network Code (MNC) in which the PLMN-ID can be identified by client device 102 and/or each WLAN AP 110a-110c during operation of system 100. Each corresponding WLAN access network 112a-112c provided by each corresponding WLAN AP 110a-110c can be configured with a corresponding network identity, such as a corresponding SSID (e.g., which can be referenced herein as 'SSID(112a)' for WLAN access network 112a, 'SSID(112b)' for WLAN access network 112b, and 'SSID(112c)' for WLAN access network 112c), such that each WLAN access network 112a-112c can be identified by client device 102, each WLAN AP 110a-110c, and/or cellular radio 120 during operation of system 100.

In various embodiments, a client device, such as client device 102, may be associated with any user, subscriber, employee, client, customer, electronic device, etc. wishing to initiate a flow in the system and may be inclusive of any device that initiates a communication in the system, such as a computer, an electronic device such as an industrial device, automation device, enterprise device, appliance, Internet of Things (IoT) device, etc., a laptop or electronic notebook, a cellular/Wi-Fi enabled telephone/smart phone, tablet, etc. and/or any other device, component, element, or object capable of initiating voice, audio, video, media, or data exchanges within system 100.

Consider an operational example for system 100 in which client device 102 connects to a first WLAN access network belonging to the roaming federation, such as WLAN access network 112a provided via WLAN AP 110a. In this example, consider that client device 102 seeks connection with WLAN AP 110a/WLAN access network 112a using the IdP profile for the IdP AUTH element 130 (e.g., a profile identified as 'user102@idp130.com) and signals a an authentication relationship for the IdP associated with IdP AUTH element 130 (e.g., 'anonymous@idp130.com', such that the client does not signal its username to the venue) toward WLAN AP 110a and CTRL/AUTH element 106, which triggers the CTRL/AUTH element 106 to initiate (after discovering the IdP AUTH element 130 using conventional OpenRoaming-based Domain Name System (DNS) discovery mechanisms as are understood in the art) and authentication exchange with IdP AUTH element 130 involving client device 102.

In accordance with embodiments herein, access network information for any neighboring access networks detected/determined by WLAN AP 110a and/or client device 102 can be signaled to IdP AUTH element 130 in order to enable IdP AUTH element 130 to determine one or more alternative access networks with which client device 102 should seek connection instead of the first access network, WLAN access network 112a in this example, to which client device 102 is currently connected or to determine/recommend an alternative IdP profile with which client device 102 should utilize to connect with the first access network. In some embodiments, location information for the access network with which client device 102 is currently connected, such as location information for WLAN AP 110a, can also be signaled to IdP AUTH element 130 to facilitate the determination.

As referred to herein an access network may be considered a 'neighboring' access network if a given AP/radio detects or otherwise determines that a coverage area of another access network that is not provided by the given AP/radio overlaps, in whole or in part, the coverage area provided by the given AP/radio and/or may be considered a 'neighboring' access network when detected by a client that is within the coverage area of a given access network. In accordance with embodiments herein, neighboring access networks and access network information for the neighboring access networks can be determined/detected by a given AP/radio and/or by a client device, such as client device 102, using various detection mechanisms, such as by detecting/determining signal strength information (e.g., RSSI, SNR, etc.) for transmissions/broadcasts provided by neighboring APs/radios, by decoding transmissions/broadcasts provided by neighboring APs/radios (e.g., beacons, probes, queries, responses for WLAN AP s/radios; System Information Blocks (SIB s)/Master Information Blocks (MIBs) for cellular radios; and/or the like).

In various embodiments, access network information determined for neighboring access networks may include any combination of: a network identity for a neighboring access network, such as an SSID for a neighboring WLAN access network or a PLMN-ID for a neighboring cellular access network; signal level information for a neighboring access network, such as RSSI, SNR, etc.; a metric or other determination regarding a degree of overlap of a neighboring access network, such as fully congruent overlapping coverage or coverage that may be associated with a cell/handover boundary, which can be determined/derived from signal level information for a neighboring access network; quality or load information for a neighboring access network, such as number of clients served by a neighboring access network and/or any load information/metrics for a neighboring access network, bandwidth for a neighboring access network; security information for a neighboring access network; regulatory information for a neighboring access network; and/or any other access network information that may inform or otherwise impact alternative network determination(s) performed by an IdP AUTH element, such as IdP AUTH element 130.

In accordance with embodiments, access network information for neighboring access networks can be generated/relayed to IdP AUTH element 130 using at least two different operational approaches in accordance with embodiments herein. In a first operational approach, the WLAN APs 110a-110c may perform neighbor discovery processes (NDP)/operations and/or enhanced signaling with client device 102 to determine/generate access network information for neighboring access networks. In a second operational approach, client device 102 may perform RF scans to measure/determine/generate access network information for neighboring access networks.

Consider, for example, various operations that can be associated with the first operational approach in which WLAN APs 110a-110c may perform any combination of neighbor discovery operations/any other RF reception capabilities and/or enhanced signaling with client device 102 in order to determine/generate access network information for neighboring access networks.

Neighbor discovery is currently supported in WLAN implementations, but is focused on channel management (e.g., an AP detects another AP on a given channel, then avoids this channel if the other AP is too close/too loud). However, in accordance with embodiments herein, neighbor discovery can be utilized in some embodiments such that each WLAN AP 110a-110c can report its discovered neighboring APs/radios (e.g., any WLAN APs and/or cellular radios) to a central management system (e.g., a WLAN controller, management platform, etc.), such as may be provided via CTRL/AUTH element 106, in some embodiments. The WLAN APs 110a-110c can each report detected SSIDs for each other (instead of merely recording the channel as used by a neighbor) and any other access network information detected for neighboring access networks and report the information to CTRL/AUTH element 106, which can store the access network information along with geolocation information for each corresponding WLAN AP 110a-110c via access network data 108, as shown in FIG. 1. In various embodiments, geolocation information for a given WLAN AP 110a, 110b, or 110c can include Global Positioning System (GPS) coordinates, latitude/longitude coordinates, and/or the like for the given WLAN AP 110a, 110b, or 110c. The geolocation information for each corresponding WLAN AP 110a-110c can be provided in addition to the RF neighborhood/neighbor discovery access network information provided for neighboring access networks.

In some embodiments, a given WLAN AP 110a-110c can utilize enhanced signaling to detect/obtain device reports generated/transmitted by client device 102, such as may be provided in accordance with IEEE 802.11k, in order to determine/generate access network information for neighboring access networks. For example, in some embodiments, a given WLAN AP 110a, 110b, or 110c can perform enhanced signaling with client device 102 in order to determine/generate access network information, such as load information that may be reported by client device 102 (e.g., via the Quality of Service (QoS) enhanced Basic Service Set (QBSS) load information element (IE), via extended QBSS load information, etc.). In some embodiments, access network information obtained via 802.11k neighbor reports (typically referred to as beacon reports) provided by client device 102 can be reported to a central management system (e.g., a WLAN controller, management platform, etc.), such as via CTRL/AUTH element 106 and stored via access network data 108. However, in other embodiments access network information obtained via 802.11k neighbor reports provided by client device 102 can be augmented, on-the-fly, to signaling provided by a given WLAN AP 110a-110c, in addition to or in lieu of reporting/storing such information via CTRL/AUTH element 106.

In one example, as shown in FIG. 1, consider that the coverage area of access network 112b and the coverage area of access network 112c are both illustrated as overlapping the coverage area of WLAN access network 112a such that WLAN AP 110a may detect/determine that WLAN access network 112b and WLAN access network 112c are overlapping/neighboring access networks of WLAN access network 112a/WLAN AP 110a. Further, consider that WLAN AP 110b may detect/determine that WLAN access network 112a and WLAN access network 112c are overlapping/neighboring access networks of access network 112b/WLAN AP 110b. Further, consider that WLAN AP 110c may detect/determine that WLAN access network 112a and access network 112c are overlapping neighboring access networks of WLAN access network 112c/WLAN AP. Additionally, consider that each WLAN AP 110a, 110b, and 110c may also detect/determine that cellular access network 122 is also an overlapping/neighboring access network of each WLAN access network/WLAN AP 112a/110a, 112b/110b, and 112c/110c (e.g., cellular access network 122 is illustrated as overlapping each WLAN access network/WLAN AP such that each WLAN AP may detect broadcasts/transmissions by cellular radio 120 involving cellular access network.

In at least one embodiment for the first operational approach, when client device 102 seeks to join/connect to a given venue access network (generally illustrated via line 114), such as WLAN access network 112a provided via WLAN AP 110a, in which the client device 102 asks to be relayed to an IdP RADIUS server, such as IdP AUTH element 130 per standard OpenRoaming procedures, as noted above, for an EAP authentication process in order to authenticate/authorize client device 102 to connect to WLAN access network 112a/WLAN AP 110a.

Through augmentation of the standard OpenRoaming procedures in accordance with embodiments herein, the venue authenticator, such as CTRL/AUTH element 106 in this example, can relay to the IdP AUTH element 130 the location of WLAN AP 110a (to which client device 102 is currently connected/joined) along with any other access network information (e.g., SSIDs, signal level information, neighbor client load, etc.) as reported by WLAN AP 110a (following neighbor discovery operations performed by WLAN AP 110a) to CTRL/AUTH element 106 and stored via access network data 108.

In another embodiment, the WLAN AP 110a can query the client device 102 for a list of WLAN APs/SSIDs that the client device 102 detected just before attempting to join/connect to WLAN AP 110a. The list/access network information can take the form of 802.11k neighbor reports. In such an embodiment, the WLAN AP 110a can forwards the list/access network information along with location information for WLAN AP 110a to the IdP AUTH element 130 via CTRL/AUTH element 106.

In various embodiments, CTRL/AUTH element 106 can signal the location of WLAN AP 110a and access network information for the neighboring WLAN access networks 112b and 112c and also for the neighboring cellular access network 122 to IdP AUTH element 130 using any combination of Attribute Value Pairs (AVPs), Type-Length-Value (TLV) objects, or the like that can be augmented to the RADIUS signaling for the EAP authentication process. In various embodiments, a given WLAN AP 110a-110c can signal its location information and corresponding access network information for neighboring access networks, as can be obtained via neighbor reports provided by client device 102 using any combination of AVPs, TLVs, and/or the like that can be augmented to RADIUS signaling for an EAP authentication process involving a given client device (e.g., client device 102).

Continuing with the present operational example, upon obtaining the location information for WLAN AP 110a and the access network information for neighboring access networks, WLAN access network 112b and 112c, IdP AUTH element 130 can then parse the location information for WLAN AP 110a and analyze the access network information (e.g., network identity, such SSID/PLMN-ID, and any optional additional information such as signal level, quality/load, etc.) in relation to roaming criteria 132 configured for IdP AUTH element 130 to determine whether one or more alternative WLAN access networks satisfy the roaming criteria 'better' than the first WLAN access network 112a and, thus, would be more preferable, from the IdP's perspective, for WLAN connection of the client device 102.

In various embodiments, roaming criteria configured for an IdP AUTH element, such as roaming criteria 132 configured for IdP AUTH element 130, can include any combination of cost criteria (e.g., for a user associated with client device 102 and/or an IdP providing financial sponsorship for client device) for allowing the client device 102 to connect to an access network (first/alternative access network); quality and/or performance criteria (e.g., bandwidth, latency, jitter, etc.) for allowing the client device to connect to an access network (first/alternative access network); security criteria (e.g., user/IdP privacy, etc.) for allowing the client device 102 to connect to an access network (first/alternative access network); regulatory criteria (e.g., information sharing, etc. that may differ between access networks/providers) for allowing the client device to connect to an access network (first/alternative access network); business relationship/rating criteria (e.g., competitive relationships, partnerships, etc.) between the IdP managing/operating IdP AUTH element 130 and each venue associate with each WLAN access network/AP 112a-112c/110a-110c for allowing the client device to connect to an access network (first/alternative access network); and/or the like.

Consider one example of security criteria that can be considered by an IdP. For example, a local venue may allow an outward virtual private network (VPN) that allows the user/client device 102 to protect its traffic from the venue's eyes (over the wire), if the IdP is an enterprise entity, the enterprise entity may want to ensure that the client device 102 utilizes a VPN out to the enterprise network. Such security criteria are not limited to an enterprise entity, however. For example, in some instances, an IdP that is a public cellular service provider/carrier may have similar security criteria.

In another example potentially involving regulatory criteria, consider an example in which a user (of client device 102) that resides in a first country is traveling in a second country and connecting to a first foreign access network provided in the second country that is operated by a first provider. In this example, a primary internet/service provider (e.g., IdP) of client device 102 may prefer that client device 102 connect to a neighboring access network operated by a second provider that may be able to provide (from a regulatory standpoint) certain details regarding connection of the client device 102 to the neighboring access network to the primary internet/service provider that the first provider for the first foreign access network may not be able to provide (from a regulatory standpoint) to the primary internet/service provider.

In yet another example potentially involving business-relationship criteria, consider an example in which client device 102 connects to a first access network operated by a first provider (first IdP) using credentials (an IdP profile) associated with a second provider (second IdP) that is a competitor with the first provider. In this example, the second provider may prefer that the client device 102 not send traffic through the first provider's (competing) network and may instead, prefer that client device connect to a neighboring access network. In a similar example, say client device 102 connects to a first access network via a first application (operating on the client device) associated with a first business (first IdP) using credentials associated with a second business (second IdP) that is a competitor of the first business. In this example, the second business may prefer client device 102 to connect to a neighboring access network instead of the first access network (e.g., due to a relationship between the second business and the neighboring access network, etc.).

Consider other various examples in which one or more alternative WLAN access networks (e.g., WLAN access networks 112b and/or 112c, in the present operational example), which can be identified via corresponding SSID(s)) may be determined by IdP AUTH element 130 to satisfy the roaming criteria 132 (e.g., any combination of such criteria) better than the first access network, WLAN access network 112a with which client device 102 is connected for the present operational example. In one instance, considering cost and quality criteria, consider that the IdP (which may be an ISP) for IdP AUTH element 130 may pay to offload traffic into a local venue. In this example, for equal bandwidth offered by two neighboring networks (e.g., WLAN access network 112a and WLAN access network 112b/112c), the IdP may prefer the access network providing a cost that is cheaper than WLAN access network 112a.

In another example considering cost and quality criteria, the user of client device 102 may be a pay-as-you-go customer that is to be provided (e.g., per a service level agreement (SLA)) a 500 Kbps bandwidth service but in which WLAN access network 112a may charge a higher cost for 1 Mbps bandwidth service as opposed to WLAN access networks 112b/112c offering 500 Kbps at a lower cost. Thus, in this example, the IdP may prefer the client device 102 to join a cheaper (or free) neighbor (e.g., WLAN access network 112b or WLAN access network 112c) instead of WLAN access network 112a. In a variation of this example, an IdP, such as an enterprise entity, may allow or prefer a higher cost for a higher bandwidth service to their employees as opposed to a lower cost lower bandwidth service because the IdP desires their employees to be more productive. A similar situation may arise in a lodging setting in which a pay Wi-Fi service offering a higher bandwidth service may be preferred over a free Wi-Fi service offering a lower bandwidth.

In yet another example considering quality criteria such as latency for a virtual reality (VR) capable client device, an IdP may prefer the client device to join a neighboring WLAN access network that offers lower latency even if the first WLAN access network and neighboring WALN access network offer comparable bandwidth. In yet another example considering quality and/or security criteria such as bandwidth throttling and/or firewalling, an IdP may prefer a client device to join a WLAN access network that does not throttle bandwidth for applications and/or that does not block some applications/websites (which could be learned by the IdP based on previous client connections with a given WLAN access network).

In yet another example considering regulatory/privacy criteria, an IdP may not want a client to join a given WLAN access network that is operated by a social networking company that logs user/client activity while the IdP operates from a regulatory domain (e.g., ETSI) in which privacy protection is a contractual component for providing client services.

Although the above roaming criteria examples illustrate scenarios in which an IdP may prefer a client device to connect to a neighboring WLAN access network rather than a first WLAN access network to which the client is connected. Embodiments herein also envision that an IdP may prefer a client device to connect to the same WLAN access network using a different IdP profile than the IdP profile with which the client device is currently connected to the WLAN access network for instances in which the IdP AUTH element may determine that an alternative IdP profile may satisfy the roaming criteria better than the IdP profile utilized by the client device for the current WLAN access network connection.

For example, in one instance considering cost/quality criteria, (the user of) client device 102 authenticates with an IdP profile for IdP AUTH element 130 that is associated a top-tier contract that is to provide the client device 102 a top-tier bandwidth for a certain volume of traffic but the WLAN access network 112a with which the client device 102 is currently connected does not provide the top-tier bandwidth.

Thus, in this example, the IdP AUTH element 130 may recommend that client device 102 connect to the WLAN access network 112a using a profile that charges a cheaper or free amount. In a variation of this example, consider that the venue does not offer the top-tier bandwidth that matches the contract with the IdP for IdP AUTH element 130, such that the IdP AUTH element may recommend to the client device to not connect to any WLAN access network (e.g., remain on a cellular connection only) or to try another profile (from another IdP) on the current WLAN access network (e.g., the client device can't obtain the top-tier bandwidth on the current Wi-Fi network, so don't use the network or try a profile from another IdP that might accept the bandwidth).

In yet another example considering security criteria, consider an example in which the IdP is an enterprise entity that prefers client device 102 to only use enterprise credentials for the enterprise entity when connecting to a guest access network authorized/operated by the enterprise entity at a first venue (e.g., a conference sponsored by the enterprise entity) such that when the client device 102 moves to a second venue (e.g., lodging or other public venue) that is not operated by the enterprise entity, the enterprise entity requests the client device to utilize credentials for another IdP profile that does not involving authenticating using the credentials for the enterprise entity.

Returning to the present operational example, if the IdP AUTH element 130 determines that the current WLAN connection is the best WLAN connection for the client device, the IdP AUTH element can return a success message (e.g., access accept, etc.), per current standards-based operations.

However, upon determining better alternative access network(s) with which the client device 102 should seek connection, the IdP AUTH element 130 can enable the client device 102 to seek connection with the better alternative WLAN access network(s) or, upon determining a better profile with which client device 102 should utilize for the connection with WLAN access network 112a, the IdP AUTH element 130 can enable the client device to utilize a different IdP profile for connection with the WLAN access network 112a In one embodiment, enabling the client device 102 to seek connection with better alternative WLAN access network(s) or to the same network using other (better) profile(s) can include causing disconnection of the client device 102 with the WLAN access network with which the client device is currently connected, such as causing disconnection with WLAN AP 110a in this example, in order to trigger the client device 102 to seek connection with one of the better alternative WLAN access network(s).

In at least one embodiment, the IdP AUTH element can return an Access-Reject message to the authenticator (CTRL/AUTH element 106), which could cause the WLAN AP 110a to trigger a disconnect for the client device 102 from the WLAN AP 110a. For example, the IdP may have compelling reasons to reject the WLAN access network 112a connection and could thus send a reject to the client. In other words, techniques herein recognize that there are three parties that may be involved in connection to a guest access network (client, guest network provider, and IdP) that can each have preferences for network selection/connection such that, in accordance with embodiments herein, each can have compelling reasons to reject one of the other two parties' preferences/recommendations. Accordingly, in this embodiment, the WLAN AP 110a can disconnect the client device 102 using techniques as understood in the art and the client device 102 could then seek connection again with the WLAN AP 110*a*/WLAN access network 112*a* using another profile (another IdP profile for authenticating with another IdP/IdP AUTH element) or could seek connection to the next best WLAN access network/SSID as determined by the client device 102 (e.g., based on internal algorithms configured for client device 102, user preferences, etc.), such as connecting to one of the WLAN AP 110*b* or WLAN AP 110*c* using the same profile (e.g., 'user102@idp130.com', in this example).

In one embodiment, techniques herein may include enabling the client device 102 to seek connection with the better alternative WLAN access network(s) such that IdP AUTH element 130 may provide a recommendation to the client device to initiate a connection with a first alternative WLAN access network. In such an embodiment, the IdP may not have a compelling reason to stop the local client connection, but rather can recommend a better alternative to the client device 102. A recommendation provided to a client device, such as client device 102, for recommending connection to an alternative WLAN access network can take many forms.

For example, in at least one embodiment, the IdP AUTH element 130 can return through RADIUS signaling (e.g., via an AVP, TLV, etc.) a preferred or 'recommended' alternative WLAN access network with which the client device 102 should seek connection. In this embodiment, the WLAN AP 110*a* can provide the SSID for the recommended WLAN access network to the client device 102. In at least one embodiment, this recommended WLAN access network/SSID can take the form of an 802.11v Basic Service Set (B S S) Transition Management (BTM) frame indicating the next best WLAN access network with which the client device 102 should seek connection and the WLAN AP 110*a* can then disconnect the client device 102.

In another embodiment, techniques herein may include enabling the client device 102 to utilize a different IdP profile for connection with the WLAN access network 112*a*.

For example, for a scenario in which the IdP for IdP AUTH element 130 may prefer that client device 102 utilize a different profile for the IdP for connection with WLAN access network 112*a*, the IdP can provide a recommendation indicating the name of the profile (e.g., 'TopTierIdP130' or any other name utilized by the IdP for the profile provisioned for the client device 102). In another example, the IdP can provide a recommendation indicating one or more profile characteristics (e.g., "use profile with credential/realm matching 'payasyougoidp130.com').

In another example for a scenario in which the IdP for IdP AUTH element 130 may prefer that client device 102 utilize a different profile that is not associated with the IdP/IdP AUTH element 130, the IdP may either indicate information/characteristics that may be identified in an alternative profile provided by another IdP. For example, if WLAN access network 112*a* offers 1 Mbps only for free but the IdP prefers 5 Mbps, the IdP AUTH element could send a recommendation for the client device 102 to select an alternate IdP profile that has a minimum uplink bandwidth/downlink bandwidth greater than or equal to 5 Mbps and the roaming network type is 'free'. In yet another example, the IdP AUTH element 130 could recommend that client device 102 use any other IdP profile other than any IdP profile associated with the IdP/IdP AUTH element 130 (e.g., 'use any other profile but not mine').

Further consider, in another example, various operations that can be associated with the second operational approach in which the client device 102 can scan all channels for WLAN access networks 110*a*-110*c* in order to find the multiple WLAN access networks 110*a*-110*c* and their corresponding SSIDs and pick the best WLAN AP/SSID with which client device 102 desires connection (e.g., based on RF measurements, internal algorithms, user preferences, etc.). For this second operational approach, consider that client device 102 seeks connection with WLAN access network 112*a*/WLAN AP 110*a* and requests to be relayed to an IdP RADIUS server, such as IdP AUTH element 130 per standard OpenRoaming procedures, as noted above, for an EAP authentication process in order to authenticate/authorize client device 102 to connect to WLAN access network 112*a*/WLAN AP 110*a*.

Through augmentation of the standard OpenRoaming dialog with the IdP AUTH element 130, the client device 102 can generate and send to the IdP AUTH element 130 a list of detected access networks that neighbor the WLAN access network 110*a* (in this example) with which the client device is seeking connection. The list can include access network information for the detected access networks, such network identity of the detected access networks (e.g., SSID(s) and/or PLMN-ID(s), if applicable) along with any other access network information determined/detected by client device 102 for the neighboring access networks. In some embodiments, access network information reported by client device 102 can include information determined/measured/etc. for cellular radio 120/cellular access network 122 (e.g., shown via the dashed line between cellular radio 120 and client device 102).

In the second operational approach, similar but not identical to the first operational approach, IdP AUTH element 130 can analyze the access network information (e.g., network identity, such as SSID, and any optional additional information such as signal level, quality/load, etc.) in relation to roaming criteria 132 configured for IdP AUTH element 130 to determine whether one or more alternative WLAN access networks satisfy the roaming criteria 'better' than the first WLAN access network and, thus, would be more preferable, from the IdPs perspective, with which the client device 102 should seek connection.

If the IdP AUTH element 130 determines that the current WLAN connection is the best WLAN connection for the client device, the IdP AUTH element can return a success message, per current standards-based operations.

However, upon determining better alternative WLAN access network(s) with which the client device 102 should seek connection, the IdP AUTH element 130 can enable the client device 102 to seek connection with the better alternative WLAN access network(s) or, upon determining a better profile with which client device 102 should utilize for the connection with WLAN access network 112*a*, the IdP AUTH element 130 can enable the client device to utilize a different IdP profile for connection with the WLAN access network 112*a* using any of the techniques as described above for the first operational approach. For example, in one embodiment, enabling the client device 102 to seek connection with better, alternative WLAN access network(s) or to the same network using other (better) profile(s) can include causing disconnection of the client device 102 with the WLAN access network with which the client device is currently connected, such as causing disconnection with WLAN AP 110*a* in this example, in order to trigger the client device 102 to seek connection with one of the better, alternative WLAN access network(s).

In at least one embodiment, the IdP AUTH element can return an Access-Reject message to the authenticator (CTRL/AUTH element 106), which could cause the WLAN AP 110*a* to trigger a disconnect for the client device 102 from the WLAN AP 110*a*. In this embodiment, the WLAN AP 110*a* can disconnect the client device 102 using techniques as understood in the art and the client device 102 could then seek connection again with the WLAN AP 110*a*/WLAN access network 112*a* using another profile (another IdP profile) or could seek connection to the next best WLAN access network/SSID as determined by the client device 102 (e.g., based on internal algorithms configured for client device 102, user preferences, etc.), such as connecting to one of the WLAN AP 110*b* or WLAN AP 110*c* using the same profile (e.g., 'user102@idp130.com', in this example).

In one embodiment, enabling the client device 102 to seek connection with the better, alternative WLAN access network(s) (identified via SSID(s)) can include providing a recommendation to the client device to initiate a connection with a first alternative access network (identified via an SSID). For example, in at least one embodiment, the IdP AUTH element can return through RADIUS signaling (e.g., via an AVP, TLV, etc.) a preferred or 'recommended' alternative WLAN access network (SSID) with which the client device 102 should seek connection. In this embodiment, the WLAN AP 110*a* can provide the recommended SSID or PLMN-ID to the client device 102 (e.g., via a BTM/11 v frame indicating the next best WLAN AP/SSID) with which the client device 102 should seek connection and the WLAN AP 110*a* can then disconnect the client device 102. In another embodiment as discussed above, techniques herein may include enabling the client device 102 to utilize a different IdP profile for connection with a given WLAN access network with which client device 102 is currently connected.

For both the first and the second operational approaches, it is possible that the client device 102 (or user thereof) may not allow connection to a recommended, better alternative access network, for example, due to any combination of RF parameters (e.g., poor signal strength of a neighboring access network), user preferences, client configuration, etc. or the client device 102 (or user thereof) may not allow/prefer connection using a different IdP profile. Thus, in accordance with embodiments herein, the client device 102 is allowed in at least one embodiment to return a decline message to the WLAN AP (e.g., via an action frame including appropriate information indicating the decline) with which the client device is currently connected, WLAN AP 110*a* for example, or in another embodiment to the IdP AUTH element 130, potentially with a reason code (e.g., indicating a local/client configuration, RF conditions, etc.). For example, client device 102 may return a decline message for scenarios in which the client device 102 (or user thereof) has compelling reasons to refuse an IdP/IdP AUTH element 130 recommendation (e.g., the IdP AUTH element 130 is merely "recommending" a change and does not have compelling reasons to refuse that the client device 102 stays connected to the current WLAN AP 110*a*/WLAN access network 112*a*, however, the client device 102 (or user thereof) has compelling reasons to not follow/adhere to an IdP/IdP AUTH element 130 recommendation. In both embodiments, the recommender (e.g., IdP AUTH element 130), can suggest the next best alternative WLAN access network (SSID), if any.

In various embodiments, suggesting a next best alternative access network can include providing a sorted list of WLA access networks, identified using SSIDs, or merely providing a single network identity for each recommendation/exchange with the client device 102, until the client device determines a suitable WLAN access network (SSID) with which to connect or disconnects from WLAN access altogether and remains on a cellular (PLMN-ID) connection (e.g., via cellular radio 120). Similar techniques may be utilized to suggest a next best alternative IdP profile or profile criteria for the client device 102 to utilize for embodiments involving alternative IdP profile recommendations.

Accordingly, techniques herein may facilitate an IdP (via a corresponding IdP AUTH element) enabling a client device to seek connection with one or more alternative WLAN access networks.

It is to be understood that recommendation(s) provided by IdP/IdP AUTH element 130 is not intended to replace the client decision. Rather, the IdP recommendation(s) can complement the client decision. For example, in the second operational approach involving 802.11k beacon reports, the client device 102 will only report neighbors that are above the client's roaming threshold. For the first operational approach, the client device 102 may not report neighboring APs/access networks but rather a local AP venue can report neighboring access network information and the IdP/IdP AUTH element can provide recommendation(s) for alternate WLAN access networks/SSIDs based on the AP location and access network information. However, in either operational approach the client device 102 can 'decline' a recommended alternative access network based on any combination of selection algorithms, user preferences, signal level information, local policies for the client device 102, profile preferences for the client device 102 etc. determined by the client device (e.g., when the client device 102 cannot accept the recommendation of an IdP/IdP AUTH element).

Architecturally, techniques prescribed herein do not replace a client RF decision with an IdP decision may not consider the client's RF conditions and/or Access Network Query Protocol (ANQP) elements/information that can be expressed by a local WLAN access network toward the client. The client device can be configured with internal arbitration criteria (signal level, etc.) that does not depend on any subscription/profile and can also be configured with additional arbitration criteria that are subscription-dependent. In a federation context, these criteria could allow the client a multiplicity of choices for network selection, which is where the techniques herein seek to enhance the client device's decision capabilities.

Thus, techniques herein do not seek to replace or override a client decision based on local arbitration criteria with a remote IdP decision, but rather seek to enhance the selection decisions of the client by providing additional criteria or recommendation(s) to the client when the client has multiple choices for network selection.

Figure 2:
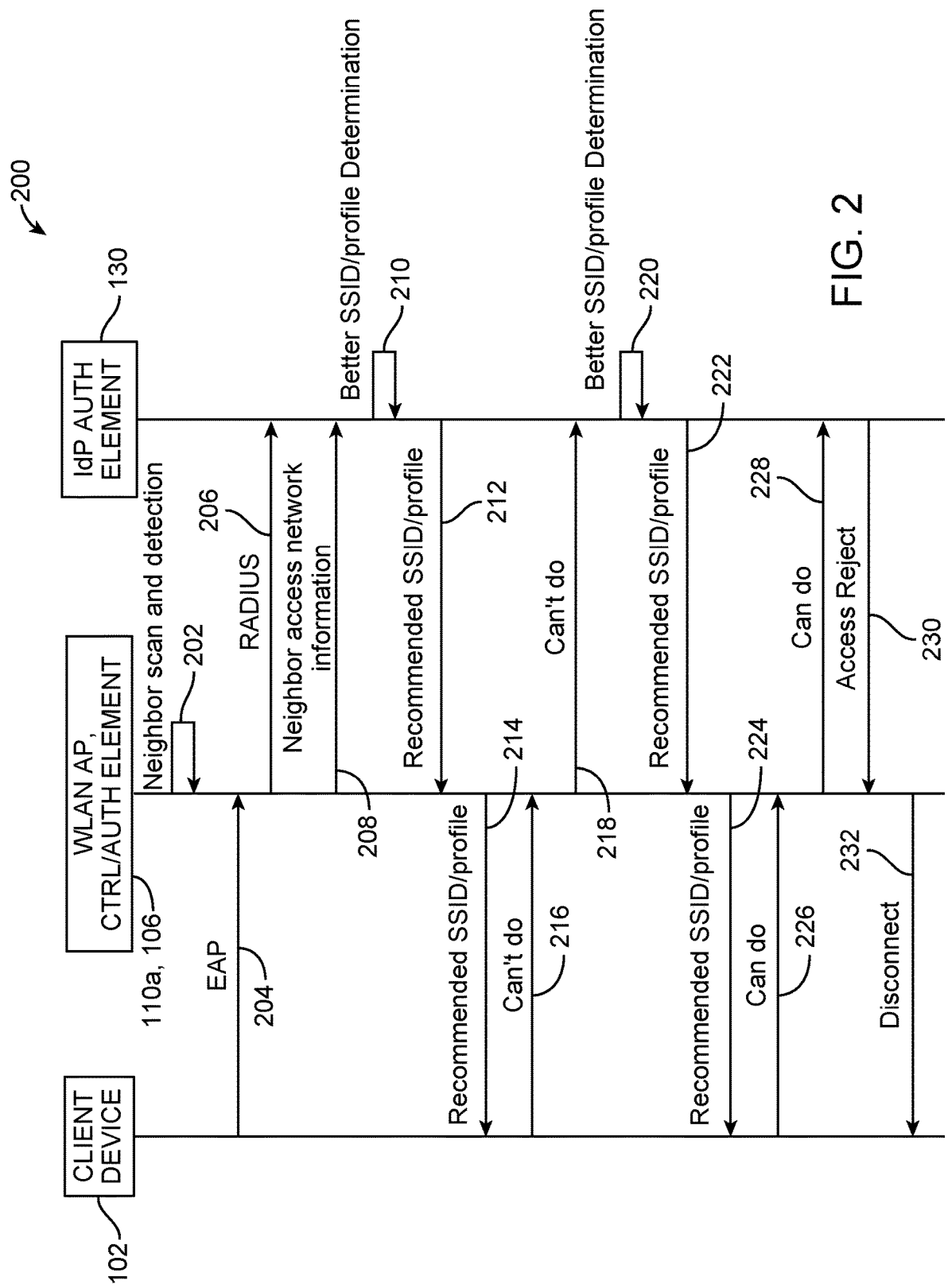
FIG. 2 is a message sequence diagram illustrating a call flow associated with providing an alternative access network indication or an alternative identity provider profile indication to a client device in a WLAN roaming federation, according to an example embodiment.

Referring to FIG. 2, FIG. 2 is a message sequence diagram illustrating a call flow 200 associated with providing an alternative access network indication or an alternative identity provider profile indication to client device 102 in the WLAN roaming federation of system 100, according to an example embodiment. In particular, call flow 200 illustrates example operations associated with providing an alternative access network indication or an alternative identity provider profile indication to client device 102 via an embodiment of the first operational approach in which WLAN AP 110*a* may perform neighbor discovery to generate access network information for neighboring access networks determined/detected by WLAN AP 110*a*. FIG. 2 includes client device 102, WLAN AP 110*a* and CTRL/AUTH element 106 of facility 104 (shown together as WLAN AP, CTRL/AUTH element in FIG. 2), and IdP AUTH element 130.

At 202, consider that WLAN AP 110*a* performs a neighbor discovery process that includes determining that WLAN access network 112*b* and WLAN access network 112*c* are overlapping/neighboring WLAN access networks and that cellular access network 122 is also an overlapping/neighboring cellular access network. Through the neighbor discovery process, the WLAN AP 110*a* can determine/generate access network information for each of the neighboring access networks in which the access network information can be sent to and stored by CTRL/AUTH element 106 (e.g., via access network data) along with location information for WLAN AP 110*a*.

At 204, consider that client device 102 initiates connection with WLAN AP 110*a*/WLAN access network 112*a* by initiating an EAP authentication process with WLAN AP 110*a* involving a first IdP profile for client device (e.g., 'user102@idp130.com', which is signaled to WLAN AP 110*a* as 'anonymous@idp130.com' for privacy reasons as noted above) that triggers RADIUS signaling 206 between client device 102, WLAN AP 110*a*/CTRL AUTH element, and IdP AUTH element 130 involving the client connection to WLAN AP 110*a*/WLAN access network 112*a* utilizing credentials for the client device 102 as configured for the first IdP profile in which the location information for WLAN AP 110*a* and the access network information for the neighboring access networks as determined/generated by WLAN AP 110*a* and stored by CTRL/AUTH element 106 is sent to IdP AUTH element 130, as shown at 208. The access network information and location information for WLAN AP 110*a* can be appended to the RADIUS signaling at 206 using any combination of AVPs, TLVs, and/or the like or can be provided via separate RADIUS signaling sent to the IdP AUTH element using any combination of AVPs, TLVs, and/or the like, as shown at 208, or any combination thereof.

At 210, consider that IdP AUTH element 130 parses the location information for WLAN AP 110*a* and analyzes the access network information for the neighboring access networks (e.g., network identity, such as SSID, and any optional additional information such as signal level, quality/load, etc.) in relation to roaming criteria 132 (not shown in FIG. 2) configured for IdP AUTH element 130 to determine whether one or more alternative WLAN access networks 112*b* or 112*c* satisfy the roaming criteria 'better' than WLAN access network 112*a* with which client device 102 is currently connected or to determine whether one or more alternative IdP profiles satisfy the roaming criteria better than the current (first) IdP profile utilized by client device 102 for the current WLAN access network 112*a* connection and, thus, would be more preferable, from the IdP's perspective, for WLAN connection of the client device 102.

Based on the analysis at 210 in this example, consider that IdP AUTH element 130 determines that an alternative WLAN access network, such as WLAN access network 112*c*, would be a better WLAN access network with which client device 102 should seek connection instead of WLAN access network 112*a*. Thus, at 212, IdP AUTH element 130 communicates a recommendation, via RADIUS signaling (e.g., using AVPs, TLVs, etc.) sent to CTRL/AUTH element 106 and WLAN AP 110*a*, that client device 102 seek connection to the (alternative) WLAN access network 112*c* such that the signaling includes the SSID for the WLAN access network 112*c* (e.g., 'SSID(112*c*)'). As shown at 214, WLAN AP 110*a* communicates the recommendation including the SSID for the WLAN access network 112*c* to client device (e.g., via a BTM/11 v frame). It is to be understood that if a better IdP profile was determined for the client device 102 connection to WLAN access network 112*a*, a profile recommendation could also be sent to the client device 102 at 212/214 (e.g., explicitly recommending a profile name if an alternative profile for the same IdP, recommending various parameters/characteristics for consideration by the client device for selecting a different IdP profile, etc.).

In the present example, consider that client device 102 is unable or otherwise does not intend to seek connection with the alternative WLAN access network 112*c* (e.g., based on an internal selection algorithm configured for the client device, user preference, poor signal strength detected for WLAN access network 112*c*, etc.) and thus signals an indication toward WLAN AP 110*a*/CTRL/AUTH element 106 and IdP AUTH element 130, as shown at 216 and 218, indicating that client device 102 cannot (or will not) seek connection with WLAN access network 112*c*. In one embodiment, the client device 102 can signal that it cannot (or will not) seek a recommended connection with a given WLAN access network via an action frame configured with any appropriate information (e.g., flag(s), AVP(s), TLV(s), etc.) to provide such an indication.

Upon receiving the indication, consider that IdP AUTH element 130 again analyzes the access network information for the neighboring access networks in relation to the roaming criteria to determines the next best alternative WLAN access network (excluding the first alternative WLAN access network 112*c* that was previously determined) with which client device 102 should seek connection, as shown at 220. A next best alternative IdP profile could be determined in a similar manner by the IdP AUTH element 130.

In this iteration of the example, consider that IdP AUTH element 130 determines that another alternative WLAN access network, such as WLAN access network 112*b*, would be a better WLAN access network with which client device 102 should seek connection instead of WLAN access network 112*a*. Thus, at 222, IdP AUTH element 130 communicates a recommendation, via RADIUS signaling sent to CTRL/AUTH element 106 and WLAN AP 110*a*, that client device 102 seek connection to WLAN access network 112*b* such that the signaling includes the SSID for the WLAN access network 112*b* (e.g., 'SSID(112*b*)'). As shown at 224, WLAN AP 110*a* communicates the recommendation including the SSID for the WLAN access network 112*c* to client device (e.g., via a BTM frame).

In this iteration of the example, consider that client device can or is willing to seek connection to the alternative WLAN access network 112*b* and thus signals an indication toward WLAN AP 110*a*/CTRL/AUTH element 106 and IdP AUTH element 130, as shown at 226 and 228, indicating that client device can (or will) seek connection with the alternative WLAN access network 112*b*.

As shown at 230, obtaining the indication by IdP AUTH element 130 that client device 102 can (or will) seek connection with WLAN access network 112*b* triggers IdP AUTH element 130 to send an Access-Reject message to the CTRL/AUTH element 106, which causes the WLAN AP 110*a* to trigger a disconnect for the client device 102 from the WLAN AP 110*a*, as shown at 232. Thereafter, although not shown in FIG. 2, client device 102 can then initiate connection with WLAN AP 110*b* via an EAP authentication exchange involving WLAN AP 110*b*, CTRL/AUTH element 106 and IdP AUTH element 130 (assuming the client device uses the same IdP profile) that results in authentication/connection of client device 102 with WLAN AP 110*b*/WLAN access network 112*b*. It is to be understood that client device 102 could also utilize another IdP profile for the subsequent connection.

Various techniques may be utilized by IdP AUTH element 130 in order to address potentially triggering another 'better' WLAN access network or IdP profile determination through the subsequent EAP exchange. For example, in one embodiment, the IdP AUTH element 130 can track client recommendations and client requests in order to determine whether a given request is in response to a previous recommendation to the client (e.g., by tracking SSIDs included in recommendations and requests). In another embodiment, the IdP AUTH element 130 may initiate a timer upon sending a recommendation to the client device 102 such that if a subsequent connection request is received from the client device within a predetermined time period (e.g., within 'n' seconds, etc.), then a subsequent analysis of the client device connection in relation to roaming criteria 132 may not be performed. In yet another embodiment, the client device 102 may include an indication (e.g., AVP, TLV, flag, etc.) in signaling for a subsequent WLAN access network connection indicating that the client device 102 is following a recommendation provided by the IdP/IdP AUTH element 130.

However, in some embodiments, the IdP AUTH element 130 may again analyze a subsequent client device 102 connection in relation to roaming criteria 132, such that if the IdP AUTH element 130 recommended a certain SSID or profile/profile characteristic for a previous connection of the client device, it is presumed that the IdP AUTH element 130 would determine that the current connection/profile is the best connection/profile for client device 102 and accept the connection.

Accordingly, FIG. 2 illustrates various techniques for enabling a client device to initiate a connection with at least one alternative (neighboring) WLAN access network or to re-initiate a connection with a current WLAN access network with which the client device is currently connected using a different IdP profile based on a determination/recommendation made by an IdP/IdP AUTH element in accordance with embodiments herein.

Figure 3:
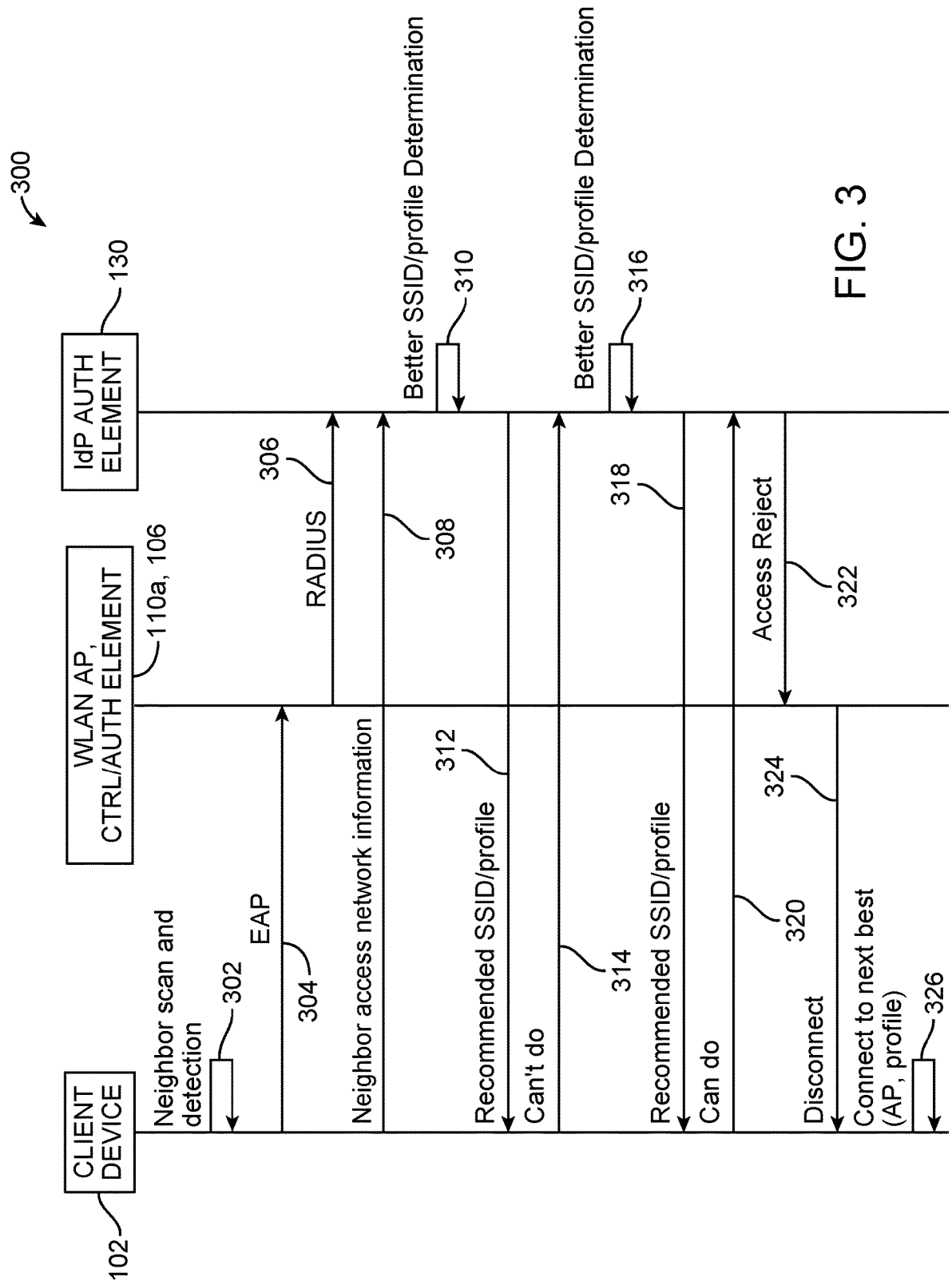
FIG. 3 is another message sequence diagram illustrating another call flow associated with providing an alternative access network indication or an alternative identity provider profile indication to a client device in a WLAN roaming federation, according to an example embodiment.

Referring to FIG. 3, FIG. 3 is a message sequence diagram illustrating a call flow 300 associated with providing an alternative access network indication or an alternative identity provider profile indication to client device 102 in the WLAN roaming federation of system 100, according to an example embodiment. In particular, call flow 300 illustrates example operations associated with providing an alternative access network indication or an alternative identity provider profile indication to client device 102 via an embodiment of the second operational approach in which client device 102 performs RF scans to determine/generate access network information for neighboring access networks. FIG. 3 includes client device 102, WLAN AP 110a and CTRL/AUTH element 106 of facility 104 (shown together as WLAN AP, CTRL/AUTH element in FIG. 2), and IdP AUTH element 130.

[woo] At 302, consider that client device 102 performs RF scans to determine (e.g., based on determined/measured received signal strength information/SNR/etc., beacon information, SIB/MB information, etc.) that WLAN access networks 112a, 112b, and 112c are overlapping/neighboring WLAN access networks and that cellular access network 122 is also an overlapping/neighboring cellular access network of the WLAN access networks for the current location of client device 102.

At 304, consider that client device 102 initiates connection with WLAN AP 110a/WLAN access network 112a by initiating an EAP authentication process with WLAN AP 110a involving credentials, realm, etc. for a first IdP profile for client device (e.g., 'user102@idp130.com', which is signaled to WLAN AP 110a as 'anonymous@idp130.com' for privacy reasons as noted above) that triggers RADIUS signaling 306 between client device 102, WLAN AP 110a/CTRL AUTH element and IdP AUTH element 130 involving the client connection to WLAN AP 110a/WLAN access network 112a utilizing credentials for the client device 102 as configured for the first IdP profile. As illustrated at 308 for the embodiment of FIG. 3, client device 102 can signal the access network information for the neighboring access networks as determined/generated by client device 102 towards IdP AUTH element 130 using any RADIUS signaling as discussed for any embodiments herein.

At 310, consider that IdP AUTH element 130 analyzes the access network information for the neighboring access networks (e.g., network identity, such as SSID, and any optional additional information such as signal level, quality/load, etc.) obtained from client device 102 in relation to roaming criteria 132 (not shown in FIG. 3) configured for IdP AUTH element 130 to determine whether one or more alternative WLAN access networks 112b or 112c satisfy the roaming criteria 'better' than WLAN access network 112a with which client device 102 is currently connected or to determine whether one or more alternative IdP profiles satisfy the roaming criteria better than the current (first) IdP profile utilized by client device 102 for the current WLAN access network 112a connection and, thus, would be more preferable, from the IdP's perspective, for WLAN connection of the client device 102.

Based on the analysis at 310 in this example, consider that IdP AUTH element 130 determines that an alternative WLAN access network, such as WLAN access network 112c, would be a better WLAN access network with which client device 102 should seek connection instead of WLAN access network 112a. Thus, at 312, IdP AUTH element 130 communicates a recommendation, via RADIUS signaling (e.g., using AVPs, TLVs, etc.) sent to CTRL/AUTH element 106 and WLAN AP 110a, that client device 102 seek connection to WLAN access network 112c such that the signaling includes the SSID for the WLAN access network 112b (e.g., 'SSID(112c)') in which WLAN AP 110a communicates the recommended SSID for the WLAN access network 112c to client device (e.g., via a BTM frame). It is to be understood that if a better IdP profile was determined for the client device 102 connection to WLAN access network 112a, a profile recommendation could also be sent to the client device 102 at 212/214 (e.g., explicitly recommending a profile name if an alternative profile for the same IdP, recommending various parameters/characteristics for consideration by the client device for selecting a different IdP profile, etc.).

In the present example, consider that client device 102 is unable or otherwise does not intend to seek connection with the alternative WLAN access network 112c (e.g., based on an internal selection algorithm configured for the client device, user preference, poor signal strength detected for WLAN access network 112c, etc.) and thus signals an indication toward WLAN AP 110a/CTRL/AUTH element 106 and IdP AUTH element 130, as shown at 314, indicating that client device 102 cannot (or will not) seek connection with WLAN access network 112c.

Upon receiving the indication, consider that IdP AUTH element 130 again analyzes the access network information for the neighboring access networks in relation to the roaming criteria to determines the next best alternative WLAN access network (excluding the first alternative WLAN access network 112c that was previously determined) with which client device 102 should seek connection, as shown at 316. A next best alternative IdP profile could be determined in a similar manner by the IdP AUTH element 130.

In this iteration of the example, consider that IdP AUTH element 130 determines that another alternative WLAN access network, such as WLAN access network 112b, would be a better WLAN access network with which client device 102 should seek connection instead of WLAN access network 112a. Thus, at 318, IdP AUTH element 130 communicates a recommendation, via RADIUS signaling sent to CTRL/AUTH element 106 and WLAN AP 110a, that client device 102 seek connection to WLAN access network 112b such that the signaling includes the SSID for the WLAN access network 112b (e.g., 'SSID(112b)') in which WLAN AP 110a communicates the recommended SSID for the WLAN access network 112c to client device (e.g., via a BTM frame).

In this iteration of the example, consider that client device can or is willing to seek connection to the alternative WLAN access network 112b and thus signals an indication toward WLAN AP 110a/CTRL/AUTH element 106 and IdP AUTH element 130, as shown at 320, indicating that client device can (or will) seek connection with the alternative WLAN access network 112b.

As shown at 322, obtaining the indication by IdP AUTH element 130 that client device 102 can (or will) seek connection with WLAN access network 112b triggers IdP AUTH element 130 to send an Access-Reject message to the CTRL/AUTH element 106, which causes the WLAN AP 110a to trigger a disconnect for the client device 102 from the WLAN AP 110a, as shown at 324.

Thereafter as shown at 326, client device 102 can then initiate connection with WLAN AP 110b via an EAP authentication exchange involving WLAN AP 110b, CTRL/AUTH element 106 and IdP AUTH element 130 (assuming the client device uses the same IdP profile) that results in authentication/connection of client device 102 with WLAN AP 110b/WLAN access network 112b. It is to be understood that client device 102 could also utilize another IdP profile for the subsequent connection.

[olio] As illustrated for the embodiment of FIG. 3, providing the access network information to the IdP AUTH element 130 facilitates visibility into the conditions (e.g., RF conditions, load, bandwidth, etc.) that the client device 102 detects locally for neighboring access networks which can facilitate enabling the client device to initiate a connection with at least one alternative (neighboring) WLAN access network or to re-initiate a connection with a current WLAN access network with which the client device 102 is currently connected using a different IdP profile based on a determination/recommendation made by an IdP/IdP AUTH element 130 in accordance with embodiments herein.

Accordingly, techniques discussed herein provide for the ability to assist the client, by offering arbitration criteria that relate to the IDP-venue relationships, that the client may not otherwise know. However, the process does not replace the client initial arbitration. Thus, an alternative access network detected by the client might be a possible candidate if its signal value is above roaming threshold from the client standpoint.

Accordingly, FIG. 3 illustrates various techniques for enabling a client device to initiate a connection with at least one alternative (neighboring) WLAN access network based on a determination/recommendation made by an IdP/IdP AUTH element in accordance with embodiments herein.

Figure 4:
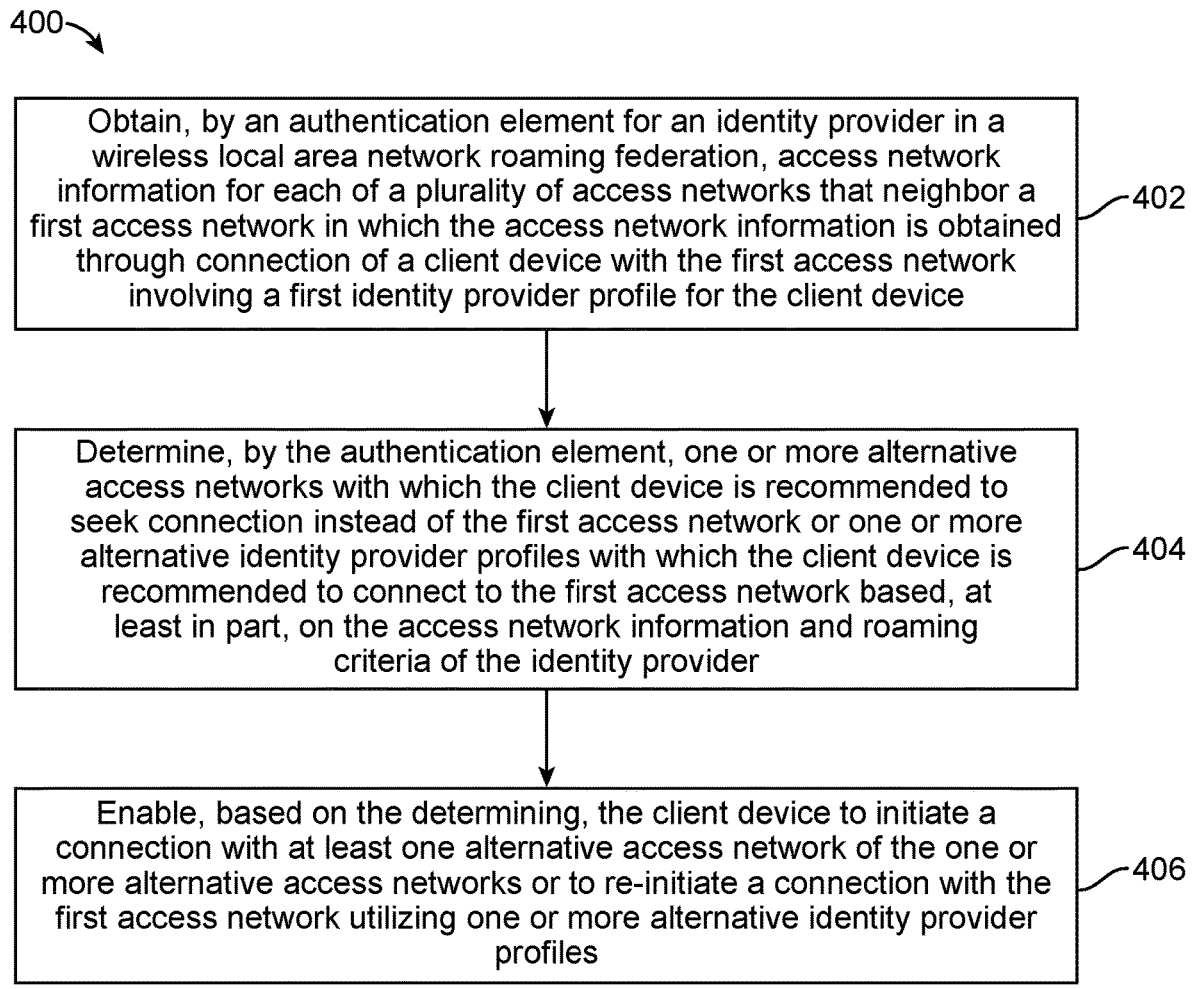
FIG. 4 is a flow chart depicting a method according to an example embodiment.

Referring to FIG. 4, FIG. 4 is a flow chart depicting a method 400 according to an example embodiment. In at least one embodiment, operations associated with method 400 may be performed, at least in part, by an IdP authentication/authorization element, such as IdP AUTH element 130 as discussed for embodiments herein.

At 402, the method may include obtaining, by an authentication element for an identity provider in a wireless local area network roaming federation, access network information for each of a plurality of access networks that neighbor a first access network in which the access network information is obtained through connection of a client device with the first access network involving a first identity provider profile for the client device. In one instance, the access network information for each the plurality of access networks that neighbor the first access network is generated by an element of the first access network (e.g., an AP based on neighbor discovery, client device reports, etc.). In one instance, the access network information for each the plurality of access networks that neighbor the first access network is generated by the client device.

At 404, the method may include determining, by the authentication element, one or more alternative access networks with which the client device is recommended to seek connection instead of the first access network or one or more alternative identity provider profiles with which the client device is recommended to connect to the first access network based, at least in part, on the access network information and roaming criteria of the identity provider.

At 406, the method may include enabling, based on the determining, the client device to initiate a connection with at least one alternative access network of the one or more alternative access networks or to re-initiate a connection with the first access network utilizing one or more alternative identity provider profiles. In one instance the enabling includes providing a recommendation to the client device to initiate the connection with the at least one alternative access network of the one or more alternative access networks in which the recommendation includes a network identity for the at least one alternative access network or providing a recommendation to the client device to re-initiate the connection with the first access network utilizing an alternative identity provider profile. In one instance, the enabling includes causing disconnection of the client device with the first access network in order for the client device to initiate the connection with the at least one alternative access network of the one or more alternative access networks or for the client device to re-initiate the connection with the first access network utilizing an alternative identity provider profile.

Figure 5:
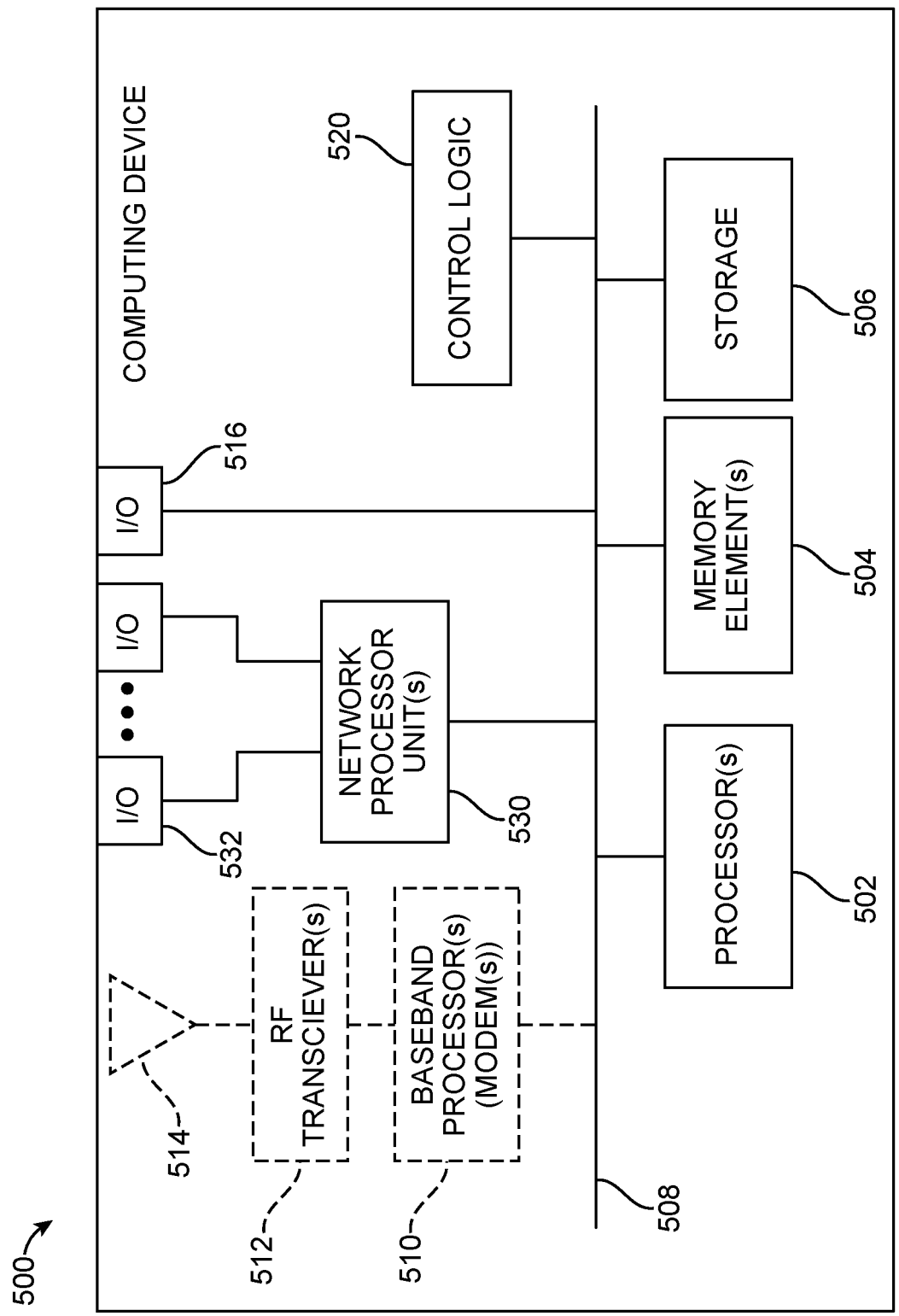
FIG. 5 is a hardware block diagram of a computing device that may perform functions associated with any combination of operations, in connection with the techniques discussed herein.

Referring to FIG. 5, FIG. 5 illustrates a hardware block diagram of a computing device 500 that may perform functions associated with operations discussed herein. In various embodiments, a computing device or apparatus, such as computing device 500 or any combination of computing devices 500, may be configured as any entity/entities as discussed herein in order to perform operations of the various techniques discussed herein.

In at least one embodiment, computing device 500 may be any apparatus that may include one or more processor(s) 502, one or more memory element(s) 504, storage 506, a bus 508, one or more I/O interface(s) 516, control logic 520, one or more one network processor unit(s) 530 and one or more network I/O interface(s) 532. In various embodiments, instructions associated with logic for computing device 500 can overlap in any manner and are not limited to the specific allocation of instructions and/or operations described herein.

For embodiments in which computing device 500 may be implemented as a client device, a radio node/access network radio (e.g., cellular radio, WLAN AP, etc.), or any other device capable of wireless communications, computing device 500 may further include at least one baseband processor or modem 510, one or more radio RF transceiver(s) 512, one or more antenna(s) or antenna array(s) 514.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, graphical processing units (GPUs), microprocessors, digital signal processor, baseband signal processor, modem, physical layer (PHY), computing devices, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa) or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that are configured for computing device 500. In at least one embodiment, bus 508 is implemented as a fast kernel-hosted interconnect, potentially using shared memory between processes (e.g., logic), which can enable efficient communication paths between the processes.

Network processor unit(s) 530 may enable communication between computing device 500 and other systems, devices, or entities, via network I/O interface(s) 532 (wired and/or wireless) to facilitate operations discussed for various embodiments described herein. In various embodiments, network processor unit(s) 530 can be configured as a combination of hardware and/or software, such as one or more Ethernet driver(s) and/or computing device(s) or interface cards, Fibre Channel (e.g., optical) driver(s) and/or computing device(s), wireless receivers/transmitters/transceivers, baseband processor(s)/modem(s), and/or other similar network interface driver(s) and/or computing device(s) now known or hereafter developed to enable communications between computing device 500 and other systems, devices, or entities to facilitate operations for various embodiments described herein. In various embodiments, network I/O interface(s) 532 can be configured as one or more Ethernet port(s), Fibre Channel ports, any other I/O port(s), and/or antenna(s)/antenna array(s) now known or hereafter developed. Thus, the network processor unit(s) 530 and/or network I/O interface(s) 532 may include suitable interfaces for receiving, transmitting, and/or otherwise communicating data and/or information (wired and/or wirelessly) in a network environment.

I/O interface(s) 516 allow for input and output of data and/or information with other entities that are connected to computing device 500. For example, I/O interface(s) 516 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen. In some embodiments, the computing device 500 supports a display having touch-screen display capabilities.

For embodiments in which computing device 500 is implemented as a UE, a radio node/access network radio (e.g., gNodeB, etc.), or any other apparatus capable of wireless communications, the RF transceiver(s) 512 may perform RF transmission and RF reception of wireless signals via antenna(s)/antenna array(s) 514, and the baseband processor or modem 510 performs baseband modulation and demodulation, etc. associated with such signals to enable wireless communications for computing device 500.

In various embodiments, control logic 520 can include instructions that, when executed, cause processor(s) 502 to perform operations, which can include, but not be limited to, providing overall control operations of computing device 500; interacting with other entities, elements, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520 of computing device 500) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) (e.g., memory element(s) 504 of computing device 500) and/or storage (e.g., storage 506 of computing device 500) can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include obtaining, by an authentication element for an identity provider in a wireless local area network roaming federation, access network information for each of a plurality of access networks that neighbor a first access network, wherein the access network information is obtained through connection of a client device with the first access network involving a first identity provider profile for the client device; determining, by the authentication element, one or more alternative access networks with which the client device is recommended to seek connection instead of the first access network or one or more alternative identity provider profiles with which the client device is recommended to connect to the first access network based, at least in part, on the access network information and roaming criteria of the identity provider; and enabling, based on the determining, the client device to initiate a connection with at least one alternative access network of the one or more alternative access networks or to re-initiate a connection with the first access network utilizing one or more alternative identity provider profiles.

In some instances, the access network information for each the plurality of access networks that neighbor the first access network is generated by an element of the first access network. In some instances, the access network information for each the plurality of access networks that neighbor the first access network is generated by the client device. In one instance, access network information is obtained through Remote Authentication Dial-In User Service (RADIUS) signaling involving the client device and the first access network.

In one instance, the access network information includes at least one of: a network identity for each of the plurality of access networks that neighbor the first access network; or at least one of quality information or load information for each of the plurality of access networks that neighbor the first access network. In one instance, the authentication element for the identity provider in the wireless local area network roaming federation further obtains location information for the first access network.

In one instance, the enabling includes providing a recommendation to the client device to initiate the connection with the at least one alternative access network of the one or more alternative access networks or providing a recommendation to the client device to re-initiate the connection with the first access network utilizing an alternative identity provider profile. In one instance, the recommendation includes a network identity for the at least one alternative access network or one of a name of the alternative identity provider profile or characteristics associated with the alternative identity provider profile.

In one instance, the method further includes following providing the recommendation to the client device, obtaining, by the authentication element, a communication indicating that the client device will not seek connection with the at least one alternative access network; and providing one or more other recommendations to the client device to initiate a connection with one or more other alternative access networks until the authentication element obtains a communication indicating that the client device will seek connection with a particular other alternative access network.

In one instance, the enabling includes causing disconnection of the client device with the first access network in order for the client device to initiate the connection with the at least one alternative access network of the one or more alternative access networks or for the client device to re-initiate the connection with the first access network utilizing an alternative identity provider profile.

In one instance, the determining includes analyzing the access network information for the first access network and for each of the plurality of access networks that neighbor the first access network in relation to the roaming criteria to determine the one or more alternative access networks that satisfy the roaming criteria better than the first access network or to determine the one or more alternative identity provider profiles that satisfy the roaming criteria better than the first identity provider profile.

In one form, an authentication element for an identity provider in a wireless local area network roaming federation is provided that includes at least one memory element for storing data; and at least one processor for executing instructions associated with the data, wherein executing the instructions causes the authentication element to perform operations, comprising: obtaining access network information for each of a plurality of access networks that neighbor a first access network, wherein the access network information is obtained through connection of a client device with the first access network involving a first identity provider profile for the client device; determining, by the authentication element, one or more alternative access networks with which the client device is recommended to seek connection instead of the first access network or one or more alternative identity provider profiles with which the client device is recommended to connect to the first access network based, at least in part, on the access network information and roaming criteria of the identity provider; and enabling, based on the determining, the client device to initiate a connection with at least one alternative access network of the one or more alternative access networks or to re-initiate a connection with the first access network utilizing one or more alternative identity provider profiles.

In one instance, the roaming criteria includes one or more of: cost criteria for allowing the client device to connect to an access network; quality criteria for allowing the client device to connect to an access network; security criteria for allowing the client device to connect to an access network; regulatory criteria for allowing the client device to connect to an access network; and business relationship criteria for allowing the client device to connect to an access network.

In one instance, a wireless network/AP/system is operable to determine an alternative, overlapping wireless network that can serve a particular subscriber/client device and signal those to an IdP/IdP AUTH element during an authentication exchange involving the client device. In one instance, a wireless network/AP/system is able to use enhanced signaling between a client device and a network to determine the possible overlapping networks. In one instance, a wireless network that is able to use integrated reception capabilities to determine the possible overlapping networks, from client device reports (e.g., IEEE 802.11k reports) or directly (e.g., via neighbor discovery processes). In one instance, a wireless network/AP is able to combine access network information gained/obtained in order to determine a metric for the degree of overlap of a particular wireless network (e.g., a wireless network that has cell/handover boundaries with a particular access network, versus one with congruent coverage).

In one instance, a client device is able to determine a list of alternative wireless networks and signal those to an IdP/IdP AUTH element, before or as part of an authentication exchange to one of the wireless networks. In one instance, a device is able to combine access network information gained/obtained during network discovery to determine a metric for the degree of overlap and usability of a set of particular networks and signal those to an IdP/IdP AUTH element, before or as part of an authentication exchange to one of the wireless networks.

In one instance, an IdP network/IdP AUTH element is operable to receive access network information signaled during an authentication exchange for a client device and to use such access network information in its authorization decisions for the client device. In one instance, an IdP/IdP AUTH element is able to selective fail authorization for a user/client device if an alternative WLAN access network and/or an access network technology (RAT) is available to serve the particular user/client device. In one instance, an IdP/IdP AUTH element is able to use an access network indication signaled in authentication signaling together with determined rating information to make an authorization decision.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity, and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and, in the claims, can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining, by an authentication element for an identity provider in a wireless local area network roaming federation, access network information for each of a plurality of access networks that neighbor a first access network, wherein the access network information is obtained through connection of a client device with the first access network involving a first identity provider profile for the client device;
   determining, by the authentication element, one or more alternative access networks with which the client device is recommended to seek connection instead of the first access network or one or more alternative identity provider profiles with which the client device is recommended to connect to the first access network based, at least in part, on the access network information and roaming criteria of the identity provider; and
   enabling, based on the determining, the client device to initiate a connection with at least one alternative access network of the one or more alternative access networks or to re-initiate a connection with the first access network utilizing one or more alternative identity provider profiles.

2. The method of claim 1, wherein the access network information for each the plurality of access networks that neighbor the first access network is generated by an element of the first access network.

3. The method of claim 1, wherein the access network information for each the plurality of access networks that neighbor the first access network is generated by the client device.

4. The method of claim 1, wherein the access network information is obtained through Remote Authentication Dial-In User Service (RADIUS) signaling involving the client device and the first access network.

5. The method of claim 1, wherein the access network information includes at least one of:
   a network identity for each of the plurality of access networks that neighbor the first access network; or
   at least one of quality information or load information for each of the plurality of access networks that neighbor the first access network.

6. The method of claim 1, wherein the authentication element for the identity provider in the wireless local area network roaming federation further obtains location information for the first access network.

7. The method of claim 1, wherein the enabling includes providing a recommendation to the client device to initiate the connection with the at least one alternative access network of the one or more alternative access networks or providing a recommendation to the client device to re-initiate the connection with the first access network utilizing an alternative identity provider profile.

8. The method of claim 7, wherein the recommendation includes a network identity for the at least one alternative access network or one of a name of the alternative identity provider profile or characteristics associated with the alternative identity provider profile.

9. The method of claim 7, further comprising:
following providing the recommendation to the client device, obtaining, by the authentication element, a communication indicating that the client device will not seek connection with the at least one alternative access network; and
providing one or more other recommendations to the client device to initiate a connection with one or more other alternative access networks until the authentication element obtains a communication indicating that the client device will seek connection with a particular other alternative access network.

10. The method of claim 1, wherein the enabling includes causing disconnection of the client device with the first access network in order for the client device to initiate the connection with the at least one alternative access network of the one or more alternative access networks or for the client device to re-initiate the connection with the first access network utilizing an alternative identity provider profile.

11. The method of claim 1, wherein the determining includes:
analyzing the access network information for the first access network and for each of the plurality of access networks that neighbor the first access network in relation to the roaming criteria to determine the one or more alternative access networks that satisfy the roaming criteria better than the first access network or to determine the one or more alternative identity provider profiles that satisfy the roaming criteria better than the first identity provider profile.

12. The method of claim 1, wherein the roaming criteria includes one or more of:
cost criteria for allowing the client device to connect to an access network;
quality criteria for allowing the client device to connect to an access network;
security criteria for allowing the client device to connect to an access network;
regulatory criteria for allowing the client device to connect to an access network; and
business relationship criteria for allowing the client device to connect to an access network.

13. One or more non-transitory computer readable storage media encoded with instructions that, when executed by a processor, cause the processor to perform operations, comprising:
obtaining, by an authentication element for an identity provider in a wireless local area network roaming federation, access network information for each of a plurality of access networks that neighbor a first access network, wherein the access network information is obtained through connection of a client device with the first access network involving a first identity provider profile for the client device;
determining, by the authentication element, one or more alternative access networks with which the client device is recommended to seek connection instead of the first access network or one or more alternative identity provider profiles with which the client device is recommended to connect to the first access network based, at least in part, on the access network information and roaming criteria of the identity provider; and
enabling, based on the determining, the client device to initiate a connection with at least one alternative access network of the one or more alternative access networks or to re-initiate a connection with the first access network utilizing one or more alternative identity provider profiles.

14. The media of claim 13, wherein the authentication element for the identity provider in the wireless local area network roaming federation further obtains location information for the first access network.

15. The media of claim 13, wherein the enabling includes providing a recommendation to the client device to initiate the connection with the at least one alternative access network of the one or more alternative access networks or providing a recommendation to the client device to re-initiate the connection with the first access network utilizing an alternative identity provider profile.

16. The media of claim 13, wherein the enabling includes causing disconnection of the client device with the first access network in order for the client device to initiate the connection with the at least one alternative access network of the one or more alternative access networks or for the client device to re-initiate the connection with the first access network utilizing an alternative identity provider profile.

17. An authentication element for an identity provider in a wireless local area network roaming federation, comprising:
at least one memory element for storing data; and
at least one processor for executing instructions associated with the data, wherein executing the instructions causes the authentication element to perform operations, comprising:
obtaining access network information for each of a plurality of access networks that neighbor a first access network, wherein the access network information is obtained through connection of a client device with the first access network involving a first identity provider profile for the client device;
determining, by the authentication element, one or more alternative access networks with which the client device is recommended to seek connection instead of the first access network or one or more alternative identity provider profiles with which the client device is recommended to connect to the first access network based, at least in part, on the access network information and roaming criteria of the identity provider; and
enabling, based on the determining, the client device to initiate a connection with at least one alternative access network of the one or more alternative access networks or to re-initiate a connection with the first access network utilizing one or more alternative identity provider profiles.

18. The authentication element of claim 17, wherein the enabling includes providing a recommendation to the client device to initiate the connection with the at least one alternative access network of the one or more alternative access networks or providing a recommendation to the client device to re-initiate the connection with the first access network utilizing an alternative identity provider profile.

19. The authentication element of claim 18, further comprising:
following providing the recommendation to the client device, obtaining, by the authentication element, a communication indicating that the client device will not seek connection with the at least one alternative access network; and
providing one or more other recommendations to the client device to initiate a connection with one or more other alternative access networks until the authentication element obtains a communication indicating that the client device will seek connection with a particular other alternative access network.

20. The authentication element of claim 17, wherein the enabling includes causing disconnection of the client device with the first access network in order for the client device to initiate the connection with the at least one alternative access network of the one or more alternative access networks or for the client device to re-initiate the connection with the first access network utilizing an alternative identity provider profile.

\* \* \* \* \*